(12) United States Patent
Cao et al.

(10) Patent No.: US 12,047,330 B2
(45) Date of Patent: Jul. 23, 2024

(54) CROSS LINK INTERFERENCE REFERENCE SIGNAL CONFIGURATION

(71) Applicant: QUALCOMM Incorporated, San Diego, CA (US)

(72) Inventors: Yiqing Cao, Beijing (CN); Huilin Xu, Temecula, CA (US); Yuwei Ren, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 17/309,615

(22) PCT Filed: Dec. 27, 2019

(86) PCT No.: PCT/CN2019/129075
§ 371 (c)(1),
(2) Date: Jun. 10, 2021

(87) PCT Pub. No.: WO2020/143477
PCT Pub. Date: Jul. 16, 2020

(65) Prior Publication Data
US 2022/0021507 A1     Jan. 20, 2022

(30) Foreign Application Priority Data
Jan. 8, 2019 (WO) ............... PCT/CN2019/070749

(51) Int. Cl.
*H04L 5/00* (2006.01)
*H04W 72/044* (2023.01)
*H04W 72/1268* (2023.01)

(52) U.S. Cl.
CPC .......... *H04L 5/0094* (2013.01); *H04L 5/0051* (2013.01); *H04L 5/0062* (2013.01); *H04W 72/044* (2013.01); *H04W 72/1268* (2013.01)

(58) Field of Classification Search
CPC ... H04L 5/0094; H04L 5/0051; H04L 5/0062; H04W 72/044; H04W 72/1268
See application file for complete search history.

(56) References Cited

U.S. PATENT DOCUMENTS 10,644,845 B2 * 5/2020 Yang .................... H04L 5/0053
2018/0102807 A1    4/2018 Chen et al.
(Continued)

OTHER PUBLICATIONS

CATT: "On Remote Interference Management Mechanism", 3GPP TSG RAN WG1 Meeting #94bis, R1-1810548, Oct. 12, 2018 (Oct. 12, 2018), Sections 2-3, 5 Pages, the whole document.
(Continued)

*Primary Examiner* — Justin T Van Roie
(74) *Attorney, Agent, or Firm* — Sevan Savsa; Harrity & Harrity, LLP

(57) ABSTRACT

Various aspects of the present disclosure generally relate to wireless communication. In some aspects, a base station (BS) may receive a first downlink determining, based at least in part on an uplink transmission schedule for a user equipment (UE), one or more communications that are to be transmitted as a cross link interference reference signal (CLI-RS) during a time window. The BS may transmit, to the UE, an instruction to transmit the one or more communications as the CLI-RS during the time window. Numerous other aspects are provided.

30 Claims, 18 Drawing Sheets

(56) References Cited

U.S. PATENT DOCUMENTS

2018/0323887 A1   11/2018   Azarian Yazdi et al.
2018/0367346 A1   12/2018   Chen et al.
2021/0321417 A1*  10/2021   Kim .................... H04L 5/0048

OTHER PUBLICATIONS

International Search Report and Written Opinion—PCT/CN2019/070749—ISA/EPO—dated Sep. 2, 2019.
International Search Report and Written Opinion—PCT/CN2019/129075—ISA/EPO—dated Mar. 27, 2020.
LG Electronics: "Discussion on Mechanism for NR RIM Support", 3GPP TSG RAN WG1 Meeting #94bis, R1-1810291, Oct. 12, 2018 (Oct. 12, 2018), pp. 1-11, XP051517705, Retrieved from the Internet: URL: http://www.3gpp.org/ftp/tsg%5Fran/WG1%5FRL1/TSGR1%5F94b/Docs/R1%2D1810291%2Ezip. Sections 1-4, section 3.
Supplementary European Search Report—EP19908312—Search Authority—The Hague—dated Sep. 12, 2022.

* cited by examiner

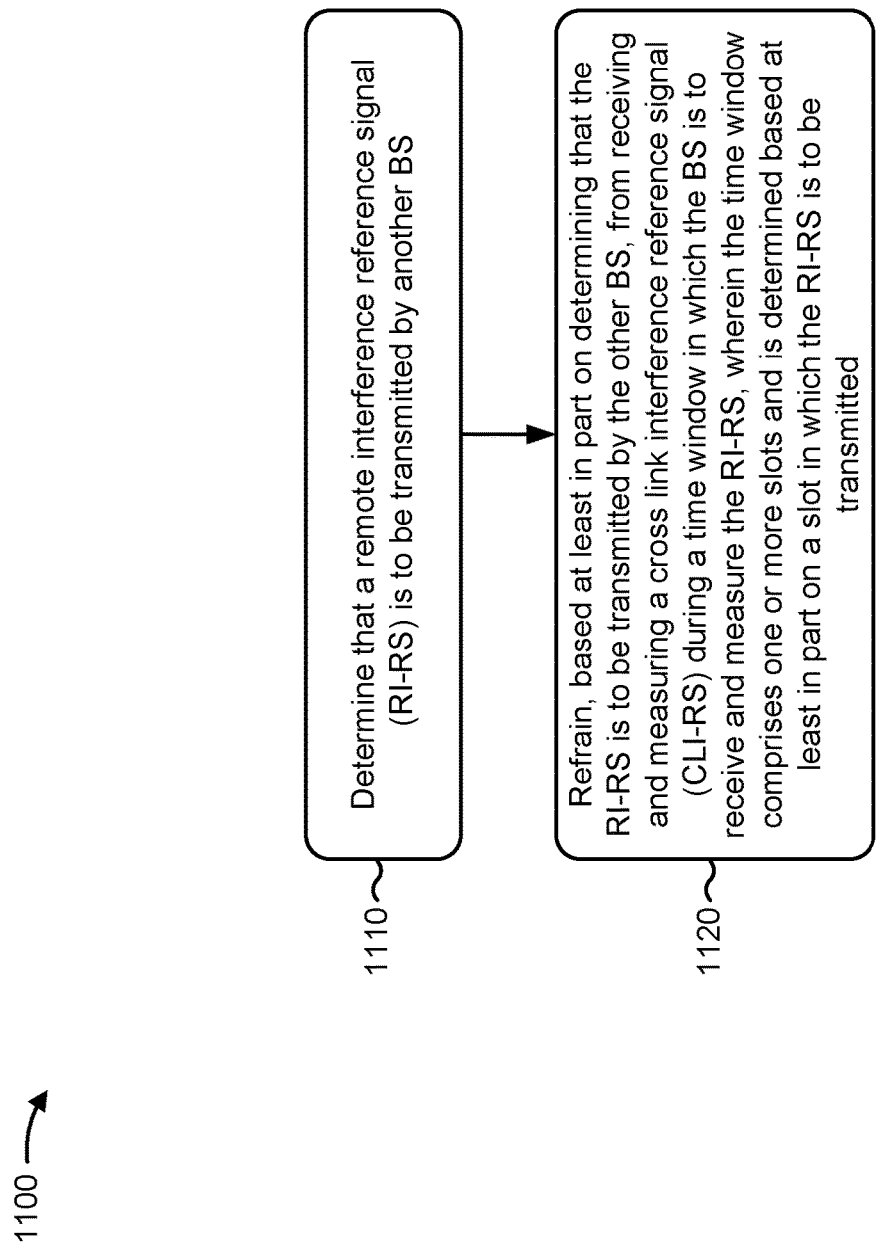

CROSS LINK INTERFERENCE REFERENCE SIGNAL CONFIGURATION

CROSS-REFERENCE TO RELATED APPLICATIONS

This application is a 371 national stage of International Patent Application No. PCT/CN2019/129075, filed on Dec. 27, 2019, entitled "CROSS LINK INTERFERENCE REFERENCE SIGNAL CONFIGURATION," which claims priority to International Patent Application No. PCT/CN2019/070749, filed on Jan. 8, 2019, entitled "CROSS LINK INTERFERENCE REFERENCE SIGNAL CONFIGURATION," which are hereby expressly incorporated by reference herein.

FIELD OF THE DISCLOSURE

Aspects of the present disclosure generally relate to wireless communication, and more particularly to techniques and apparatuses for cross link interference reference signal configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include determining that a remote interference reference signal (RI-RS) is to be transmitted. The method may include transmitting, to a user equipment (UE), an instruction to refrain from transmitting a cross link interference reference signal (CLI-RS) during a time window that comprises one or more slots and is determined based at least in part on a slot in which the RI-RS is to be transmitted.

In some aspects, a BS for wireless communication may include memory and one or more processors operatively coupled to the memory. The memory and the one or more processors may be configured to determine that an RI-RS is to be transmitted. The memory and the one or more processors may be configured to transmit, to a UE, an instruction to refrain from transmitting a CLI-RS during a time window that comprises one or more slots and is determined based at least in part on a slot in which the RI-RS is to be transmitted.

In some aspects, a non-transitory computer-readable medium may store one or more instructions for wireless communication. The one or more instructions, when executed by one or more processors of a BS, may cause the one or more processors to determine that an RI-RS is to be transmitted. The one or more instructions, when executed by one or more processors of a BS, may cause the one or more processors to transmit, to a UE, an instruction to refrain from transmitting a CLI-RS during a time window that comprises one or more slots and is determined based at least in part on a slot in which the RI-RS is to be transmitted.

In some aspects, an apparatus for wireless communication may include means for determining that an RI-RS is to be transmitted. The apparatus may include means for transmitting, to a UE, an instruction to refrain from transmitting a CLI-RS during a time window that comprises one or more slots and is determined based at least in part on a slot in which the RI-RS is to be transmitted.

In some aspects, a method of wireless communication, performed by a BS, may include determining, based at least in part on an uplink transmission schedule for a UE, one or more communications that are to be transmitted as a CLI-RS during a time window. The method may include transmitting, to the UE, an instruction to transmit the one or more communications as the CLI-RS during the time window.

In some aspects, a base station for wireless communication may include memory and one or more processors operatively coupled to the memory. The memory and the one or more processors may be configured to determine, based at least in part on an uplink transmission schedule for a UE, one or more communications that are to be transmitted as a CLI-RS during a time window. The memory and the one or more processors may be configured to transmit, to the UE, an instruction to transmit the one or more communications as the CLI-RS during the time window.

In some aspects, a non-transitory computer-readable medium may store one or more instructions for wireless communication. The one or more instructions, when executed by one or more processors of a base station, may cause the one or more processors to determine, based at least in part on an uplink transmission schedule for a UE, one or more communications that are to be transmitted as a CLI-RS during a time window. The one or more instructions, when executed by one or more processors of a base station, may cause the one or more processors to transmit, to the UE, an instruction to transmit the one or more communications as the CLI-RS during the time window.

In some aspects, an apparatus for wireless communication may include means for determining, based at least in part on an uplink transmission schedule for a UE, one or more communications that are to be transmitted as a CLI-RS during a time window. The apparatus may include means for transmitting, to the UE, an instruction to transmit the one or more communications as the CLI-RS during the time window.

In some aspects, a method of wireless communication, performed by a BS, may include determining that an RI-RS is to be transmitted by another BS, one or more communications that are to be transmitted as a CLI-RS during a time window. The method may include refraining, based at least in part on determining that the RI-RS is to be transmitted by the other BS, from transmitting a CLI-RS during a time window in which the BS is to receive and measure the RI-RS, wherein the time window comprises one or more slots and is determined based at least in part on a slot in which the RI-RS is to be transmitted.

In some aspects, a base station for wireless communication may include memory and one or more processors operatively coupled to the memory. The memory and the one or more processors may be configured to determine that an RI-RS is to be transmitted by another BS, one or more communications that are to be transmitted as a CLI-RS during a time window. The memory and the one or more processors may be configured to refrain, based at least in part on determining that the RI-RS is to be transmitted by the other BS, from transmitting a CLI-RS during a time window in which the BS is to receive and measure the RI-RS, wherein the time window comprises one or more slots and is determined based at least in part on a slot in which the RI-RS is to be transmitted.

In some aspects, a non-transitory computer-readable medium may store one or more instructions for wireless communication. The one or more instructions, when executed by one or more processors of a base station, may cause the one or more processors to determine that an RI-RS is to be transmitted by another BS, one or more communications that are to be transmitted as a CLI-RS during a time window. The one or more instructions, when executed by one or more processors of a base station, may cause the one or more processors to refrain, based at least in part on determining that the RI-RS is to be transmitted by the other BS, from transmitting a CLI-RS during a time window in which the BS is to receive and measure the RI-RS, wherein the time window comprises one or more slots and is determined based at least in part on a slot in which the RI-RS is to be transmitted.

In some aspects, an apparatus for wireless communication may include means for determining that an RI-RS is to be transmitted by another apparatus, one or more communications that are to be transmitted as a CLI-RS during a time window. The apparatus may include means for refraining, based at least in part on determining that the RI-RS is to be transmitted by the other apparatus, from transmitting a CLI-RS during a time window in which the apparatus is to receive and measure the RI-RS, wherein the time window comprises one or more slots and is determined based at least in part on a slot in which the RI-RS is to be transmitted.

In some aspects, a method of wireless communication, performed by a BS, may include determining that an RI-RS is to be transmitted by another BS, one or more communications that are to be transmitted as a CLI-RS during a time window. The method may include refraining, based at least in part on determining that the RI-RS is to be transmitted by the other BS, from receiving and measuring a CLI-RS during a time window in which the BS is to receive and measure the RI-RS, wherein the time window comprises one or more slots and is determined based at least in part on a slot in which the RI-RS is to be transmitted.

In some aspects, a base station for wireless communication may include memory and one or more processors operatively coupled to the memory. The memory and the one or more processors may be configured to determine that a RI-RS is to be transmitted by another BS, one or more communications that are to be transmitted as a CLI-RS during a time window. The memory and the one or more processors may be configured to refrain, based at least in part on determining that the RI-RS is to be transmitted by the other BS, from receiving and measuring a CLI-RS during a time window in which the BS is to receive and measure the RI-RS, wherein the time window comprises one or more slots and is determined based at least in part on a slot in which the RI-RS is to be transmitted.

In some aspects, a non-transitory computer-readable medium may store one or more instructions for wireless communication. The one or more instructions, when executed by one or more processors of a base station, may cause the one or more processors to determine that an RI-RS is to be transmitted by another BS, one or more communications that are to be transmitted as a CLI-RS during a time window. The one or more instructions, when executed by one or more processors of a base station, may cause the one or more processors to refrain, based at least in part on determining that the RI-RS is to be transmitted by the other BS, from receiving and measuring a CLI-RS during a time window in which the BS is to receive and measure the RI-RS, wherein the time window comprises one or more slots and is determined based at least in part on a slot in which the RI-RS is to be transmitted.

In some aspects, an apparatus for wireless communication may include means for determining that an RI-RS is to be transmitted by another apparatus, one or more communications that are to be transmitted as a CLI-RS during a time window. The apparatus may include means for refraining, based at least in part on determining that the RI-RS is to be transmitted by the other apparatus, from receiving and measuring a CLI-RS during a time window in which the apparatus is to receive and measure the RI-RS, wherein the time window comprises one or more slots and is determined based at least in part on a slot in which the RI-RS is to be transmitted.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-11 are diagrams illustrating example processes performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
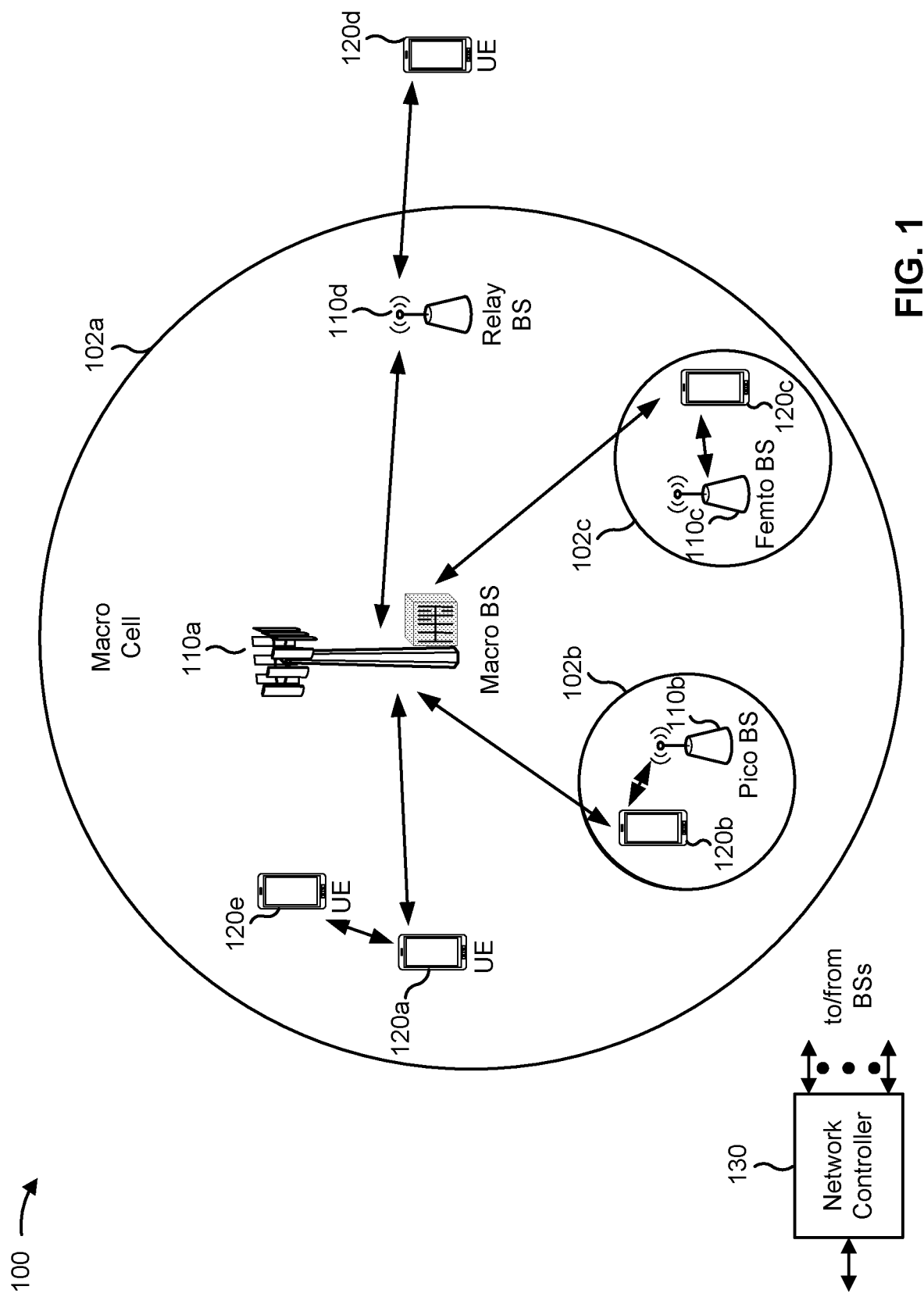
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., a remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
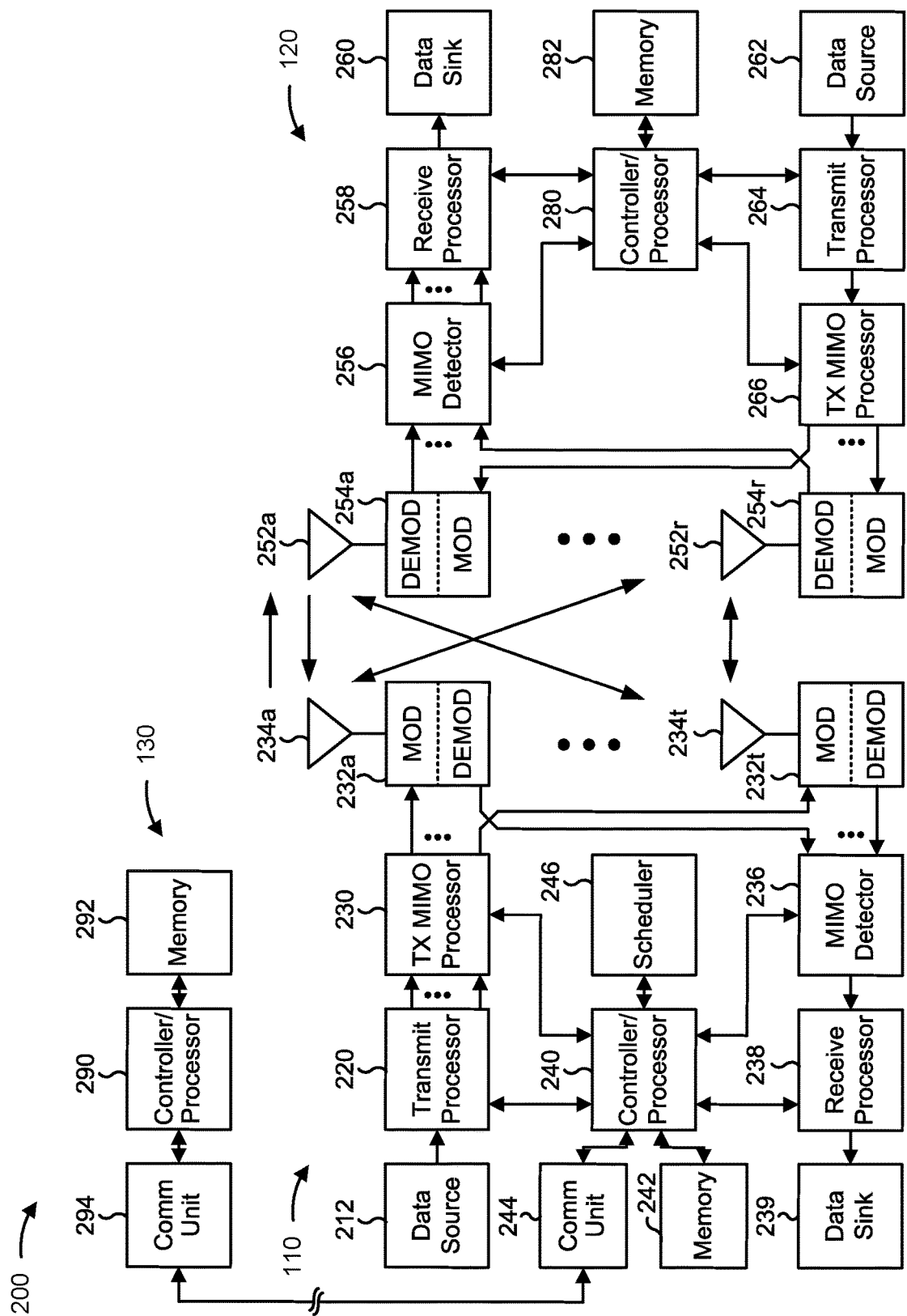
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with cross link interference reference signal configuration, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes or combinations of processes as described herein. Memories 242 and 282 may store data and program codes for base station 110 and UE 120, respectively. A scheduler 246 may schedule UEs for data transmission on the downlink and/or uplink.

In some aspects, base station 110 may include means for determining that a remote interference reference signal (RI-RS) is to be transmitted, means for transmitting, to a UE 120, an instruction to refrain from transmitting a cross link interference reference signal (CLI-RS) during a time window that comprises one or more slots and is determined based at least in part on a slot in which the RI-RS is to be transmitted, and/or the like. In some aspects, base station 110 may include means for determining, based at least in part on an uplink transmission schedule for a UE 120, one or more communications that are to be transmitted as a CLI-RS during a time window, means for transmitting, to the UE 120, an instruction to transmit the one or more communications as the CLI-RS during the time window, and/or the like. In some aspects, base station 110 may include means for determining that an RI-RS is to be transmitted by another base station 110, means for refraining, based at least in part on determining that the RI-RS is to be transmitted by the other base station 110, from transmitting a CLI-RS during a time window in which base station 110 is to receive and measure the RI-RS, wherein the time window comprises one or more slots and is determined based at least in part on a slot in which the RI-RS is to be transmitted, and/or the like. In some aspects, base station 110 may include means for determining that an RI-RS is to be transmitted by another base station 110, means for refraining, based at least in part on determining that the RI-RS is to be transmitted by the other base station 110, from receiving and measuring a CLI-RS during a time window in which base station 110 is to receive and measure the RI-RS, wherein the time window comprises one or more slots and is determined based at least in part on a slot in which the RI-RS is to be transmitted, and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
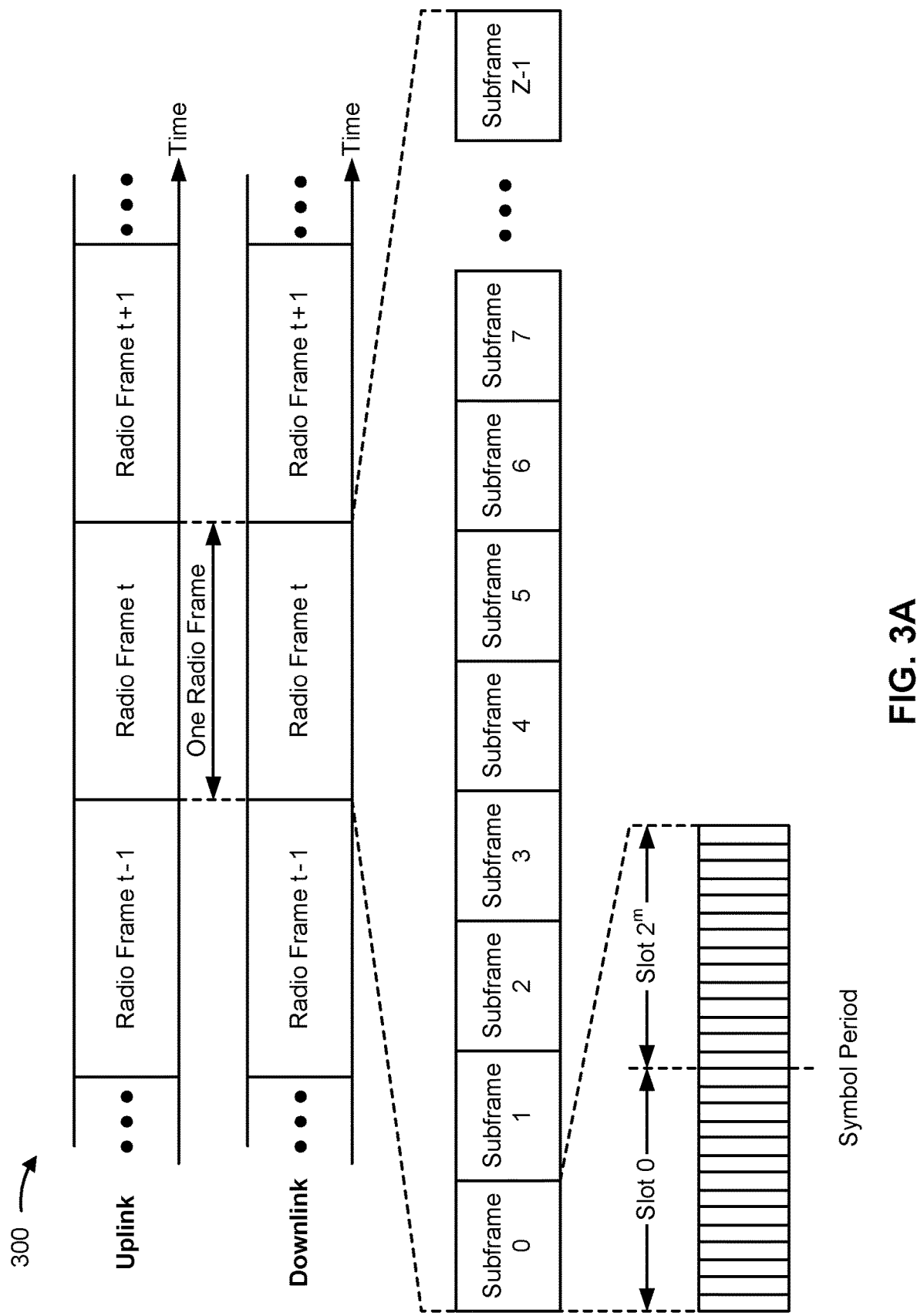
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
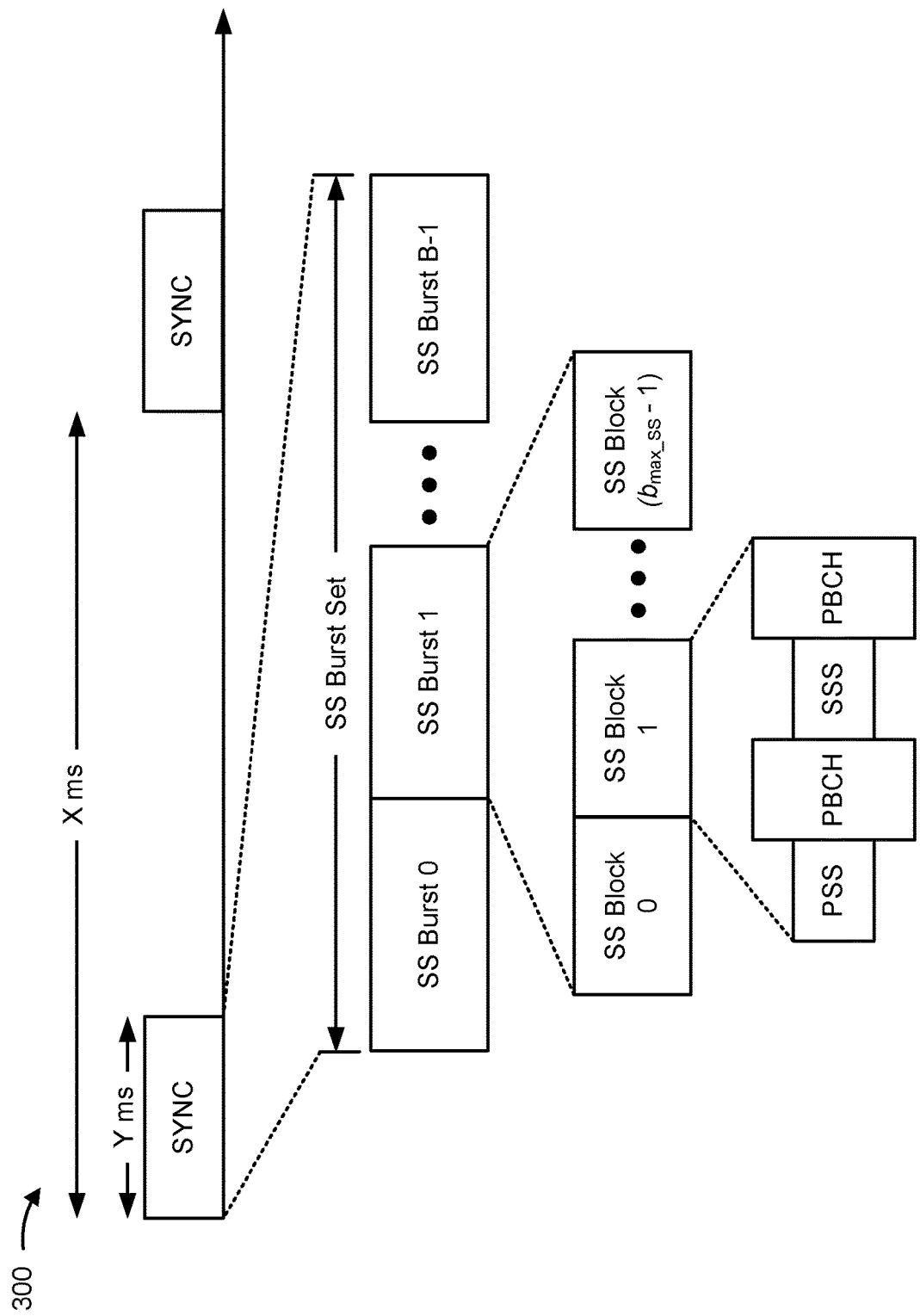
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
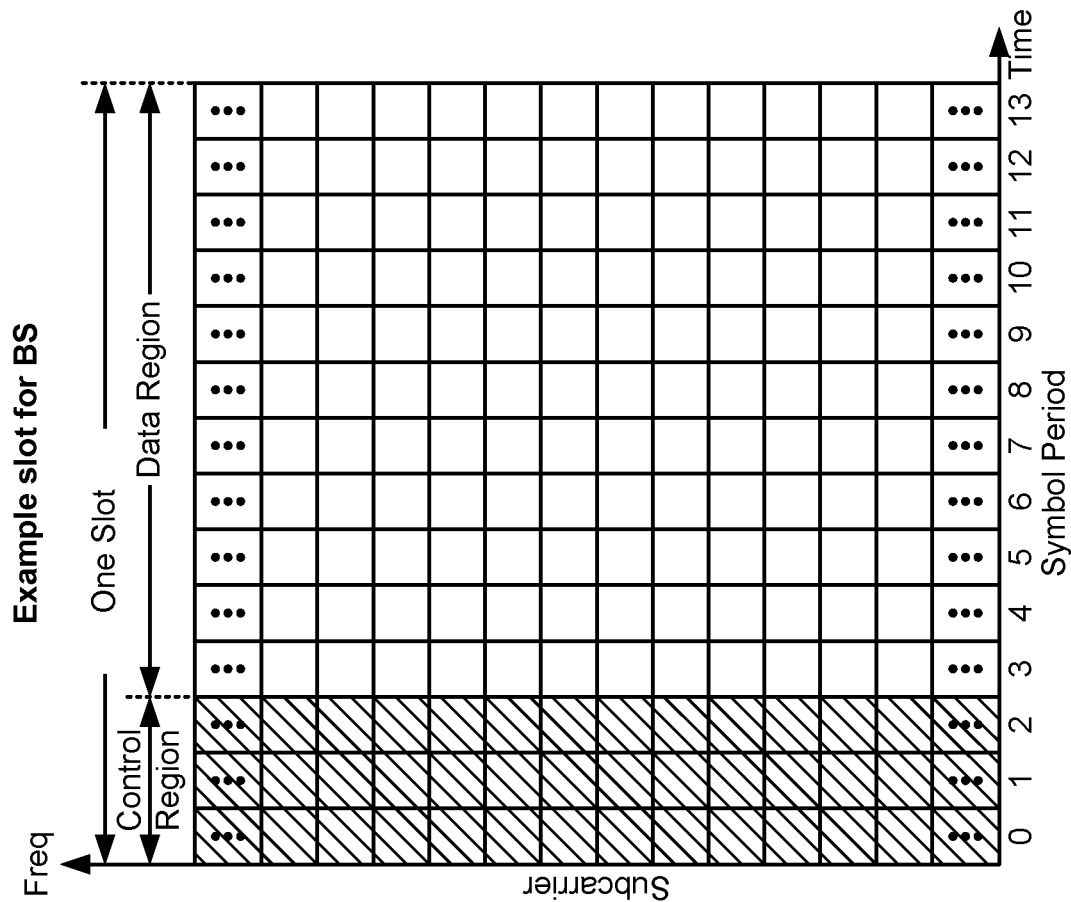
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where q $\in\{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
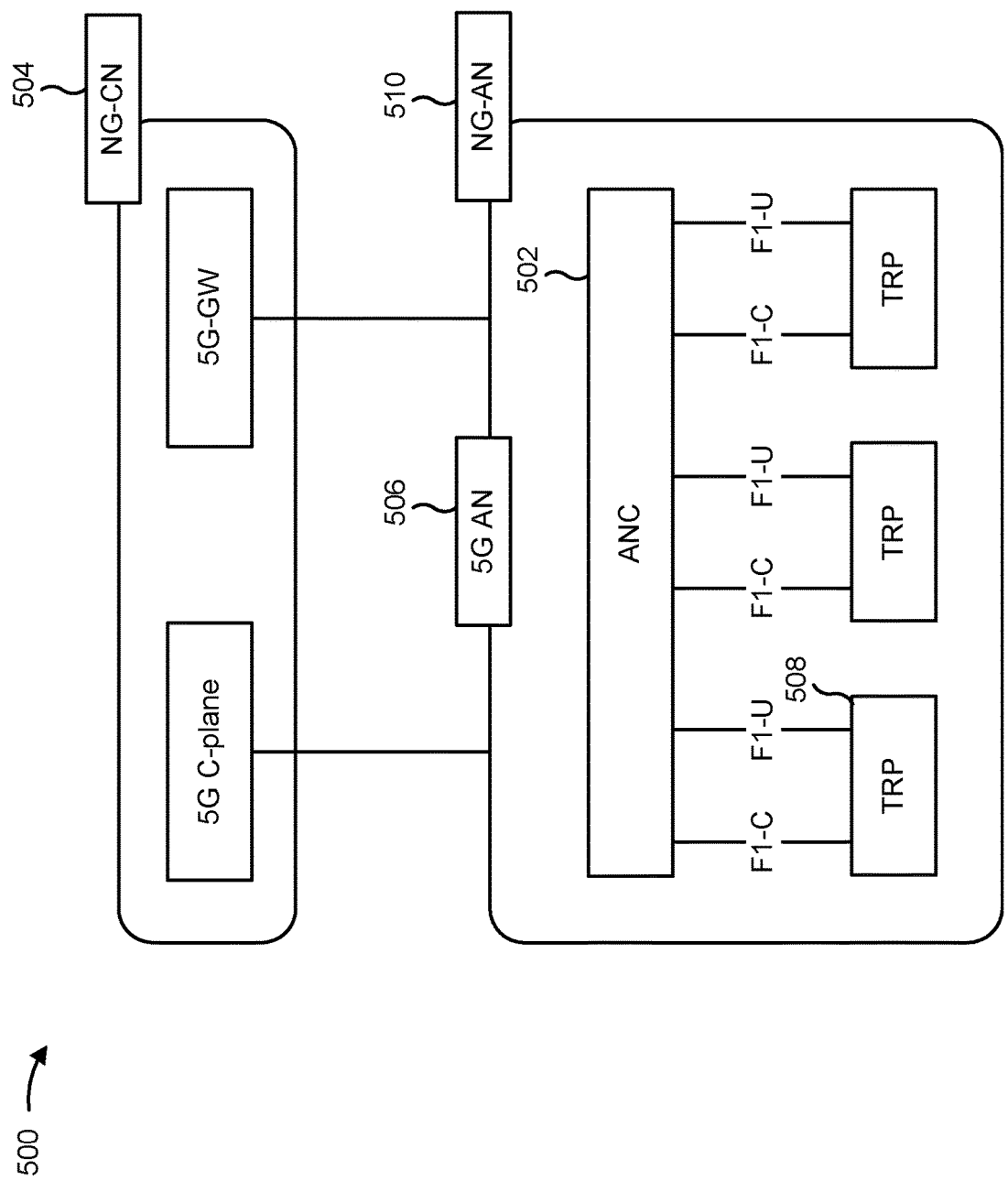
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
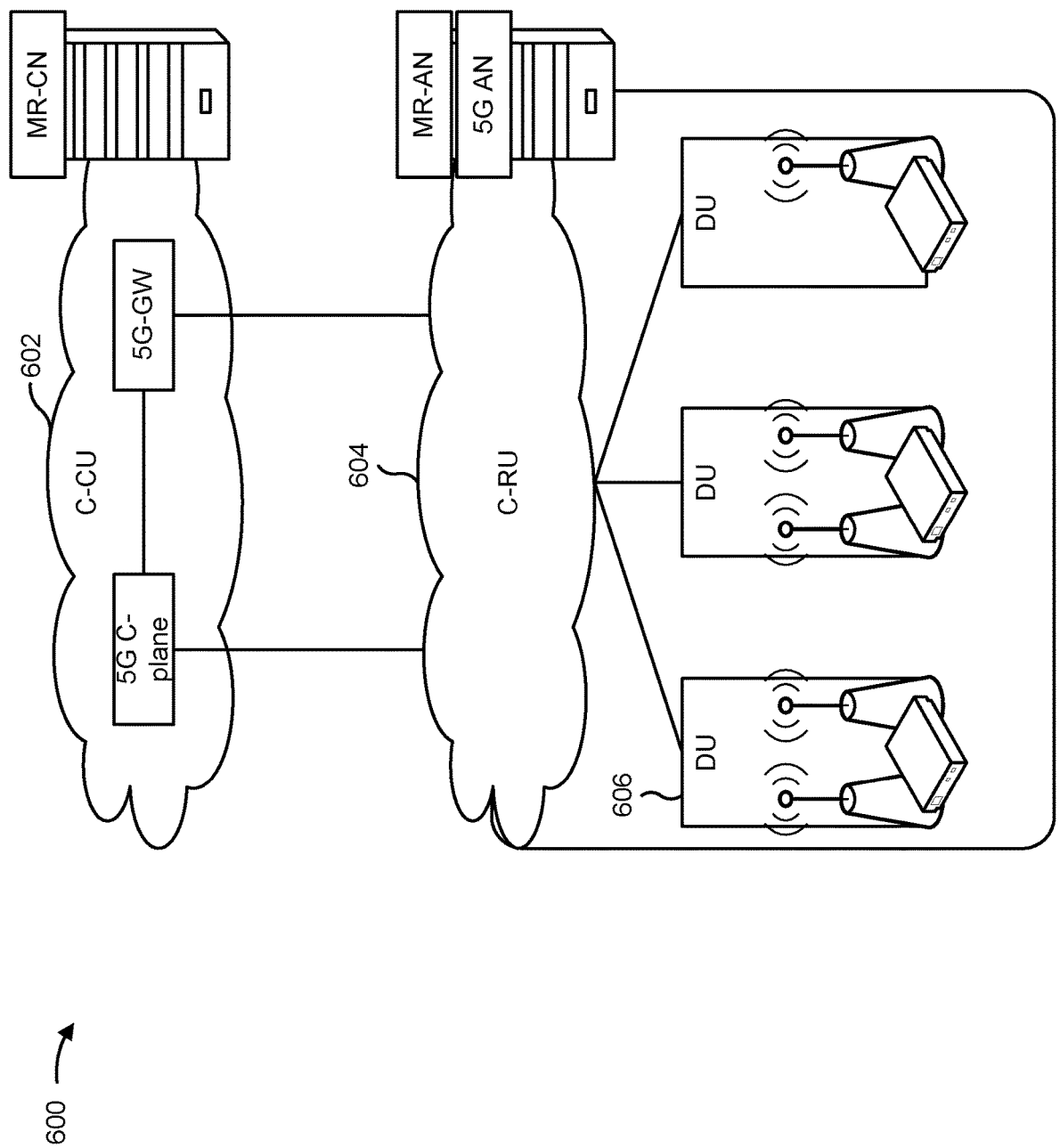
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Cross link interference (CLI) may refer to interference, with a wireless communication link between a first BS and a first UE, that is caused by transmissions on a wireless communication link between a second BS and a second UE. CLI may occur BS to BS, UE to UE, and/or the like. For example, a downlink transmission by the first BS may cause CLI with an uplink transmission that is received by the second BS. As another example, an uplink transmission by the first UE may cause CLI with a downlink transmission that is received by the second UE.

An aggressor BS (e.g., a base station that is causing CLI) may transmit a CLI-RS to a victim BS (e.g., a BS that is being interfered with by the CLI), and the victim BS may measure the CLI-RS and provide a feedback report to the aggressor BS so that the aggressor BS may adjust one or more parameters (e.g., transmit power, frame structure, and/or the like) to reduce and/or eliminate the BS to BS CLI. Similarly, an aggressor UE may transmit a CLI-RS to a victim UE, and the victim UE may measure the CLI-RS and provide a feedback report to the aggressor UE so that the aggressor BS may adjust one or more parameters to mitigate the CLI.

In some cases, the transmission and/or reception of a CLI-RS may at least partially coincide with the transmission and/or reception of a RI-RS. Remote interference (RI) may refer to interference that occurs due to atmospheric ducting. Atmospheric ducting may refer to a natural phenomenon in which a layer of cool air is sandwiched between layers of warm air near the surface of the Earth. The layers of warm air cause the layer of cool air to act as a waveguide for electromagnetic waves propagating near the surface of the Earth. As a result, electromagnetic waves, that would otherwise propagate into space, are directed along the curvature of the surface of the Earth. Atmospheric ducting can cause a transmission by a BS to travel a greater distance (e.g., up to 300 Km or more) than intended and/or expected, which can lead to the transmission of an RI-RS reaching another BS (e.g., such as another BS with which the BS does not have a line of sight) with relatively high transmit power and after a relatively long propagation delay (e.g., 500 ms to 1 second), which in turn can cause interference with the transmission and/or reception of a CLI-RS at the other BS, can cause interference with the transmission and/or reception of a CLI-RS at a UE that is served by the BS, can cause interference with the transmission and/or reception of a CLI-RS of a UE that is served by the other BS, and/or the like.

Some aspects described herein provide techniques and apparatuses for CLI-RS configuration. In some aspects, a BS may determine that an RI-RS is to be transmitted, and may transmit, to a UE, an instruction to refrain from transmitting and/or receiving and measuring a CLI-RS during a first time window that is determined based at least in part on a slot in which the RI-RS is to be transmitted, may refrain from transmitting and/or receiving and measuring a CLI-RS during the first time window, may transmit, to the UE, an instruction to transmit one or more communications, as a CLI-RS, during a second time window, and/or the like. In this way, the BS configures the transmission and/or reception and measurement of one or more CLI-RSs such that the transmission and/or reception and measurement of one or more CLI-RSs do not interfere with the transmission and/or reception and measurement of an RI-RS, such that the transmission and/or reception and measurement of one or more CLI-RSs do not interfere with the transmission and/or reception of data communications, and/or the like. This permits the BS and the UE to perform measurements of a CLI-RS and/or RI-RS with increased accuracy (e.g., due to reduced interference between the CLI-RS and the RI-RS), permits the BS and the UE to transmit and/or receive data communications with reduced interference that would have otherwise resulted from the CLI-RS, and/or the like.

FIGS. 7A-7G are diagrams illustrating an example 700 of cross link interference reference signal configuration, in accordance with various aspects of the present disclosure. As shown in FIGS. 7A-7G, example 700 may include a plurality of base stations (BSs) (e.g., BS 110a, BS 110b, and/or the like) and a plurality of user equipments (UEs) (UE 120a, UE 120b, and/or the like). In some aspects, the plurality of BSs and the plurality of UEs may be included in a wireless network. BS 110a may be a serving BS for UE 120a, and BS 110b may be a serving BS for UE 120b.

Figure 7A:
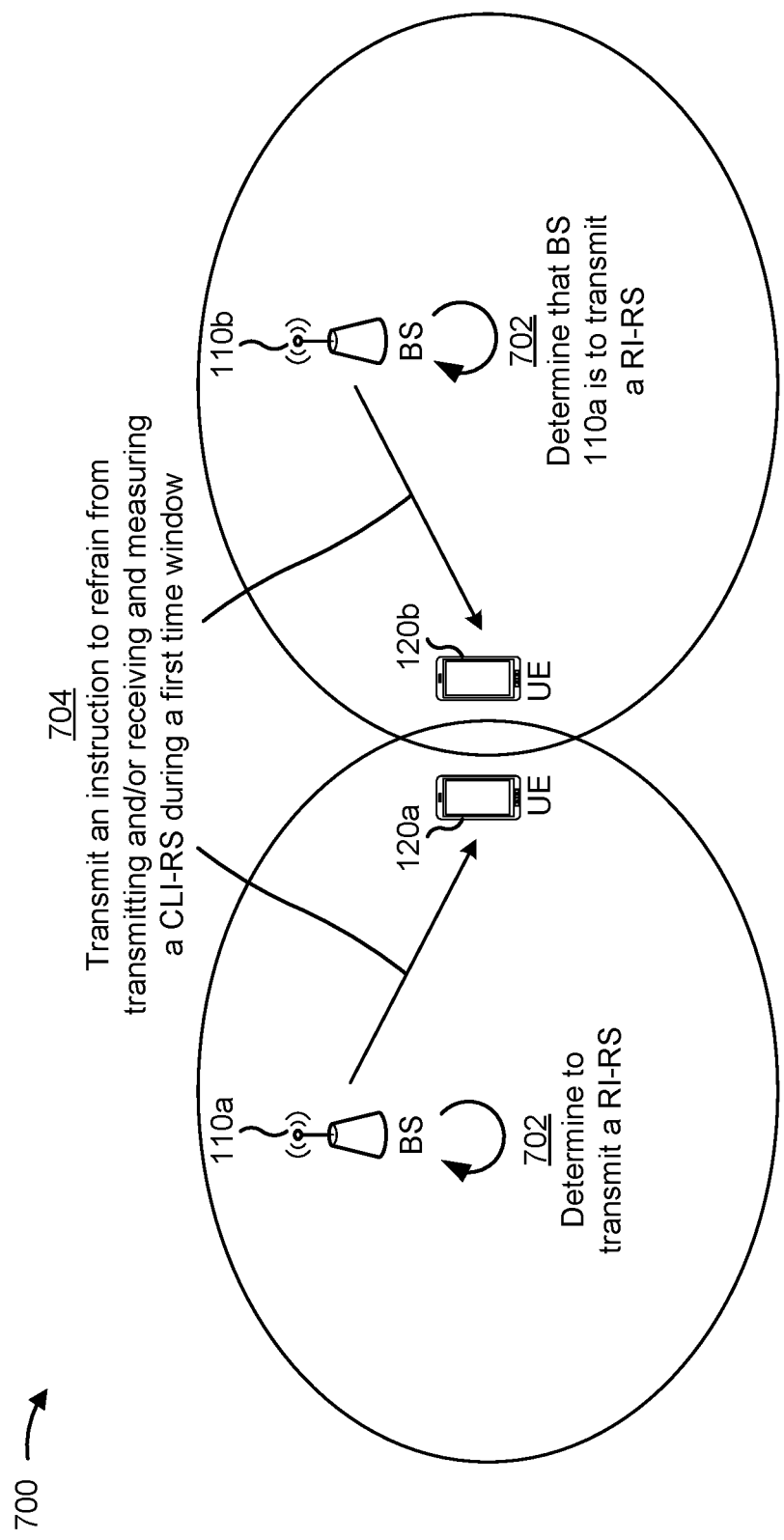
FIGS. 7A-7G are diagrams illustrating an example of cross link interference reference signal configuration, in accordance with various aspects of the present disclosure.

As shown in FIG. 7A, and by reference number 702, BS 110a may determine to transmit a remote interference reference signal (RI-RS) and BS 110b may determine that BS 110a is to transmit the RI-RS. In some aspects, BS 110a may determine to transmit the RI-RS, and BS 110b may determine that BS 110a is to transmit the RI-RS, based at least in part on BS 110a being configured (e.g., by one or more network function devices included in the wireless network, by another entity included in the wireless network, and/or the like) to transmit the RI-RS. In some aspects, BS 110a may determine to transmit the RI-RS, and BS 110b may determine that BS 110a is to transmit the RI-RS, based at least in part on BS 110b detecting RI caused by BS 110a and transmitting an instruction to BS 110a to transmit the RI-RS based at least in part on detecting the RI. In some aspects, BS 110b may determine that BS 110a is to transmit the RI-RS based at least in part on detecting the RI-RS being transmitted by BS 110a.

As further shown in FIG. 7A, and by reference number 704, BS 110a and BS 110b may each transmit an instruction, to one or more UEs that are served respectively by BS 110a and BS 110b, to refrain from transmitting and/or receiving and measuring a CLI-RS during a first time window. For example, BS 110a may transmit, to UE 120a, an instruction to refrain from transmitting and/or receiving and measuring a CLI-RS during the first time window, BS 110b may transmit, to UE 120b, an instruction to refrain from transmitting and/or receiving and measuring a CLI-RS during the first time window, and/or the like. In some aspects, the instruction that is transmitted by BS 110a and BS 110b may be included in a radio resource control (RRC) communication, a downlink control information (DCI) communication, a medium access control control element (MAC-CE) communication, and/or the like.

Figure 7B:
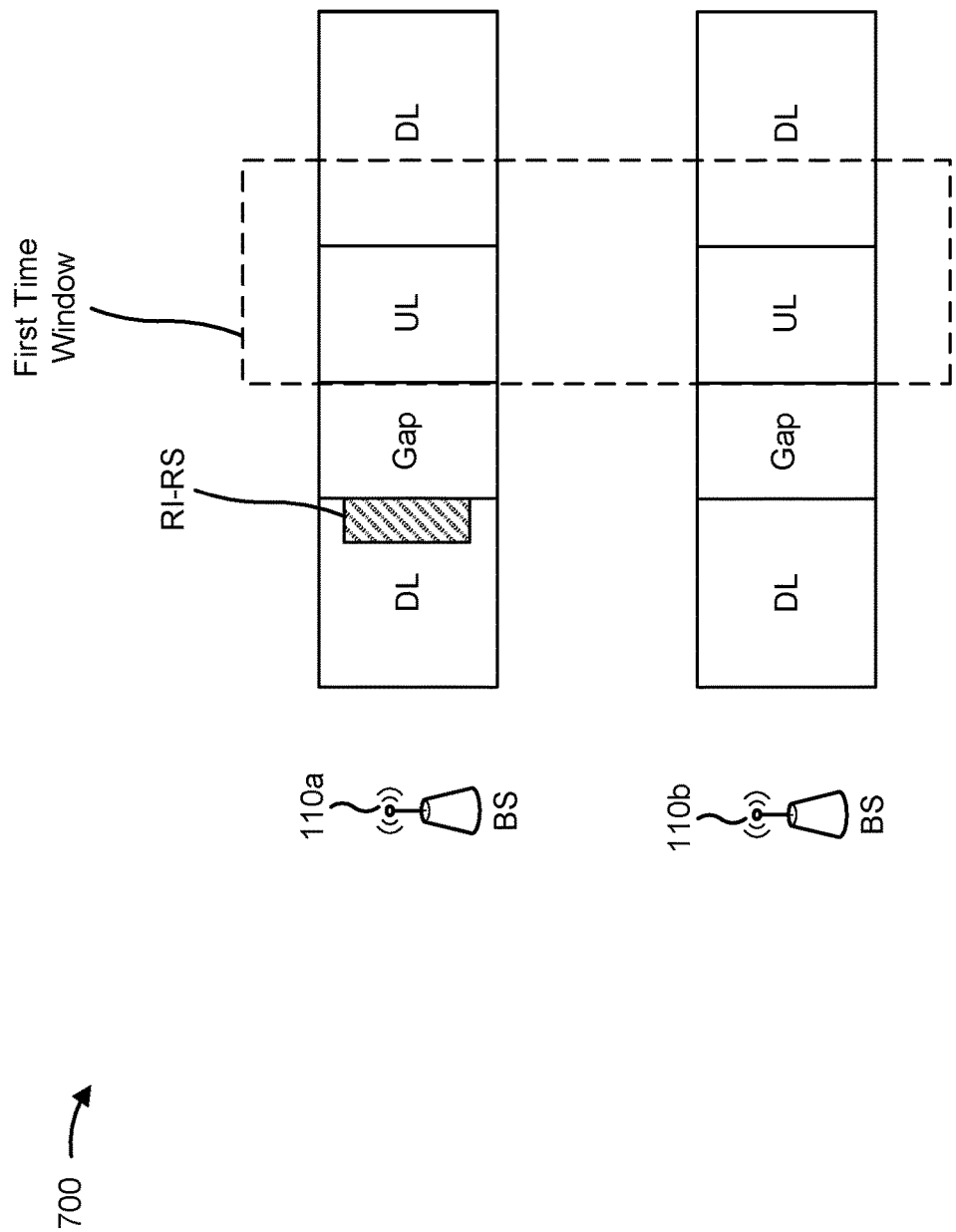
Figure 7C:
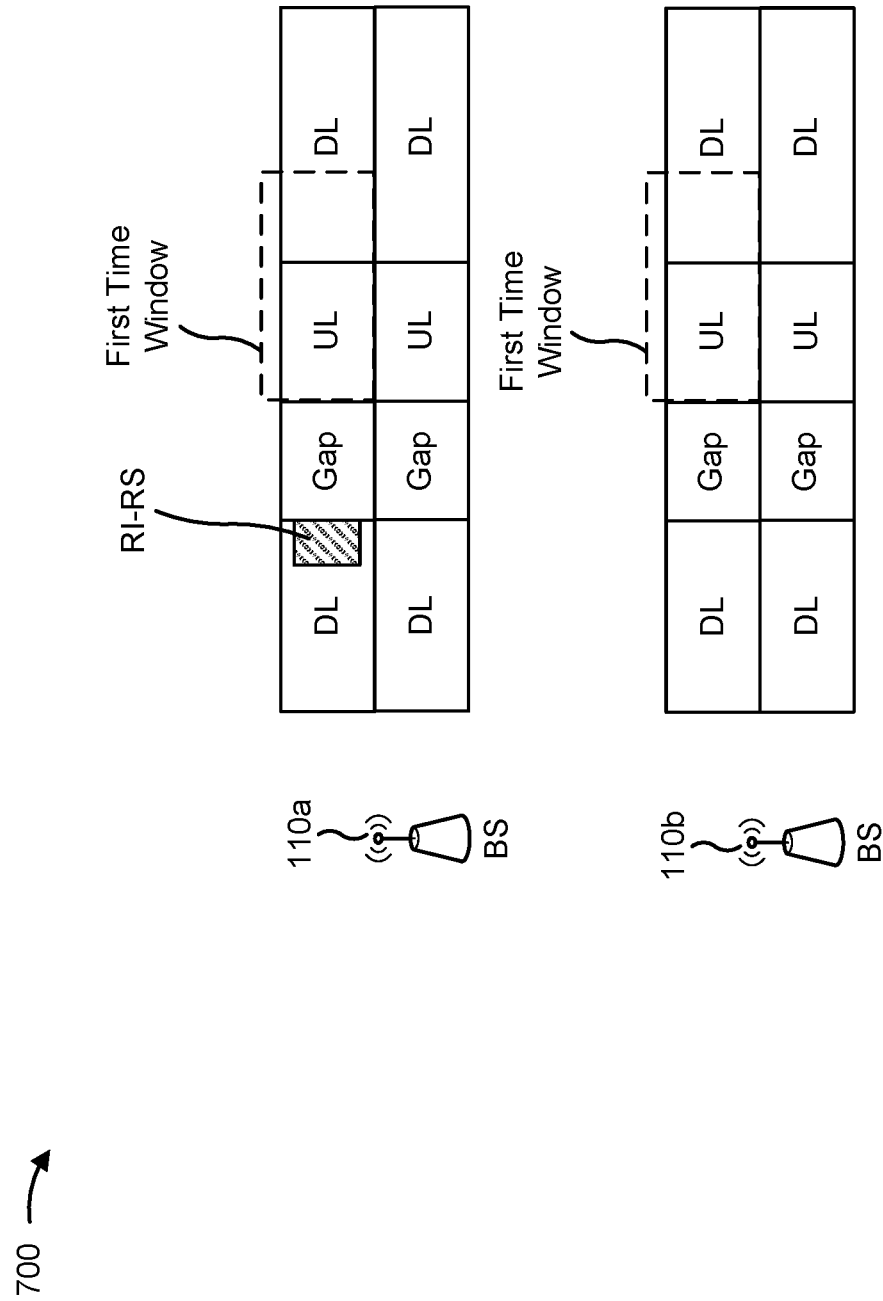

As shown in FIGS. 7B and 7C, the first time window may include one or more slots (e.g., one or more uplink slots, one or more downlink slots, and/or the like). For example, the instruction transmitted by BS 110a to UE 120a may specify that UE 120a is to refrain from transmitting and/or receiving and measuring a CLI-RS during one or more slots included in a wireless communication link between BS 110a and UE 120a. As another example, the instruction transmitted by BS 110b to UE 120b may specify that UE 120b is to refrain from transmitting and/or receiving and measuring a CLI-RS during one or more slots included in a wireless communication link between BS 110b and UE 120b.

In some aspects, the first time window may include the entire frequency range of the wireless communication link between BS 110a and UE 120a, and the entire frequency range of the wireless communication link between BS 110b and UE 120b, as shown in FIG. 7B. In some aspects, the first time window may include a subset of the frequency range of the wireless communication link between BS 110a and UE 120a, and may include the entire frequency range of the wireless communication link between BS 110b and UE 120b, as shown in FIG. 7C. In this case, the instruction transmitted by BS 110a to UE 120a may specify that UE 120a is to refrain from transmitting and/or receiving and measuring a CLI-RS during one or more slots and on one or more frequency subcarriers, and the instruction transmitted by BS 110b to UE 120b may specify that UE 120b is to refrain from transmitting and/or receiving and measuring a CLI-RS during one or more slots and on one or more frequency subcarriers.

In some aspects, BS 110a and BS 110b may determine the one or more slots, that are to be included in the first time window, based at least in part on a slot in which the RI-RS is to be transmitted. For example, BS 110a and BS 110b may determine an estimated propagation delay between BS 110a and BS 110b, and may determine a starting slot, of the one or more slots, that occurs at a time that coincides with the estimated propagation delay from the slot in which the RI-RS is to be transmitted. As another example, BS 110a and BS 110b may determine a quantity of slots, to be included in the first time window, based at least in part on receiving a network configuration from one or more network function devices and/or other entities included in the wireless network, based at least in part on an expected accuracy of the estimated propagation delay, and/or the like.

Figure 7D:
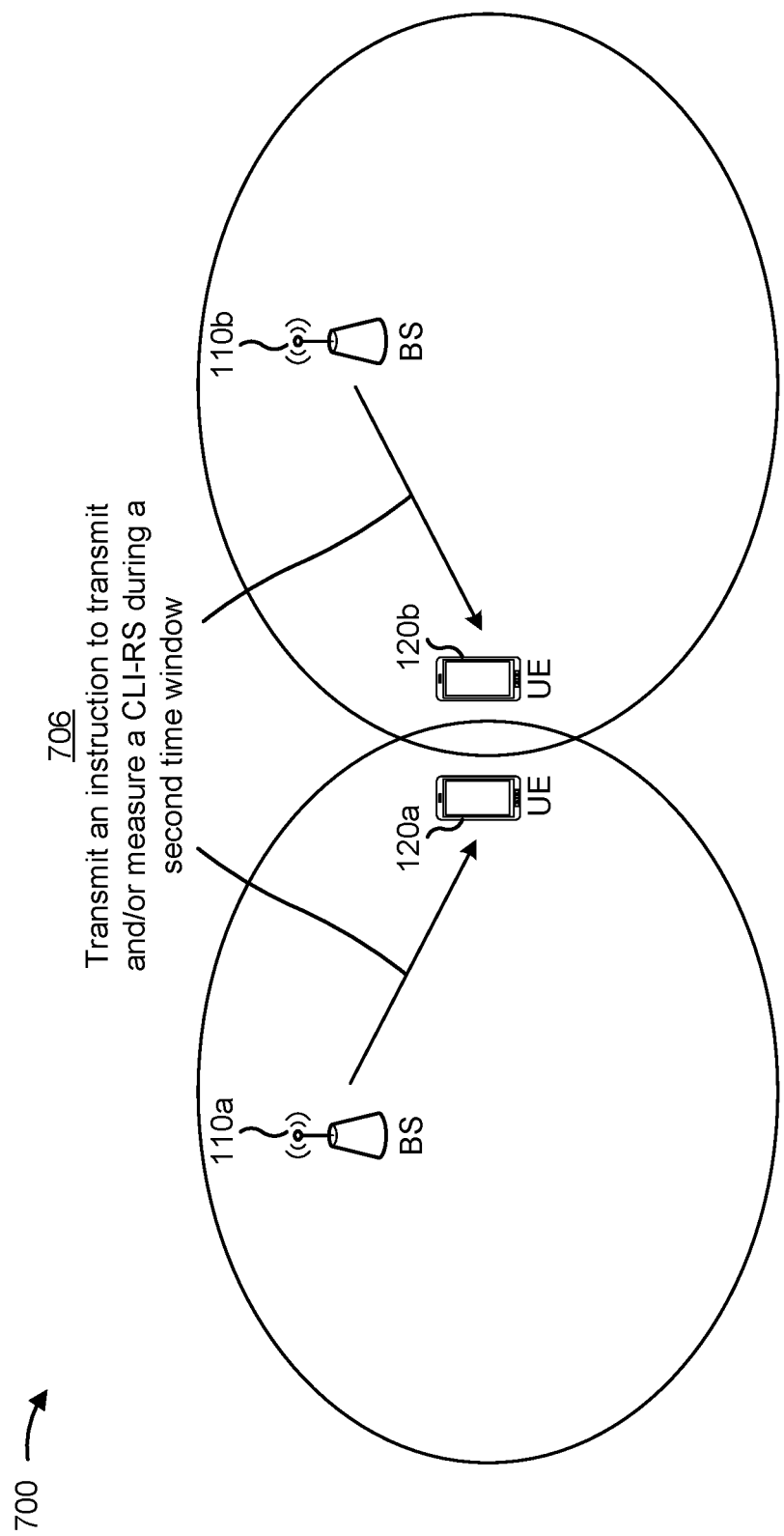

As shown in FIG. 7D, and by reference number 706, BS 110a and BS 110b may each transmit an instruction, to the one or more UEs that are served respectively by BS 110a and BS 110b, to transmit and/or receive and measure a CLI-RS during a second time window. For example, BS 110a may transmit, to UE 120a, an instruction to transmit and/or receive and measure a CLI-RS during the second time window, BS 110b may transmit, to UE 120b, an instruction to transmit and/or receive and measure a CLI-RS during the second time window, and/or the like. In some aspects, the instruction that is transmitted by BS 110a and BS 110b may be included in a radio resource control (RRC) communication, a downlink control information (DCI) communication, a medium access control control element (MAC-CE) communication, and/or the like.

Figure 7E:
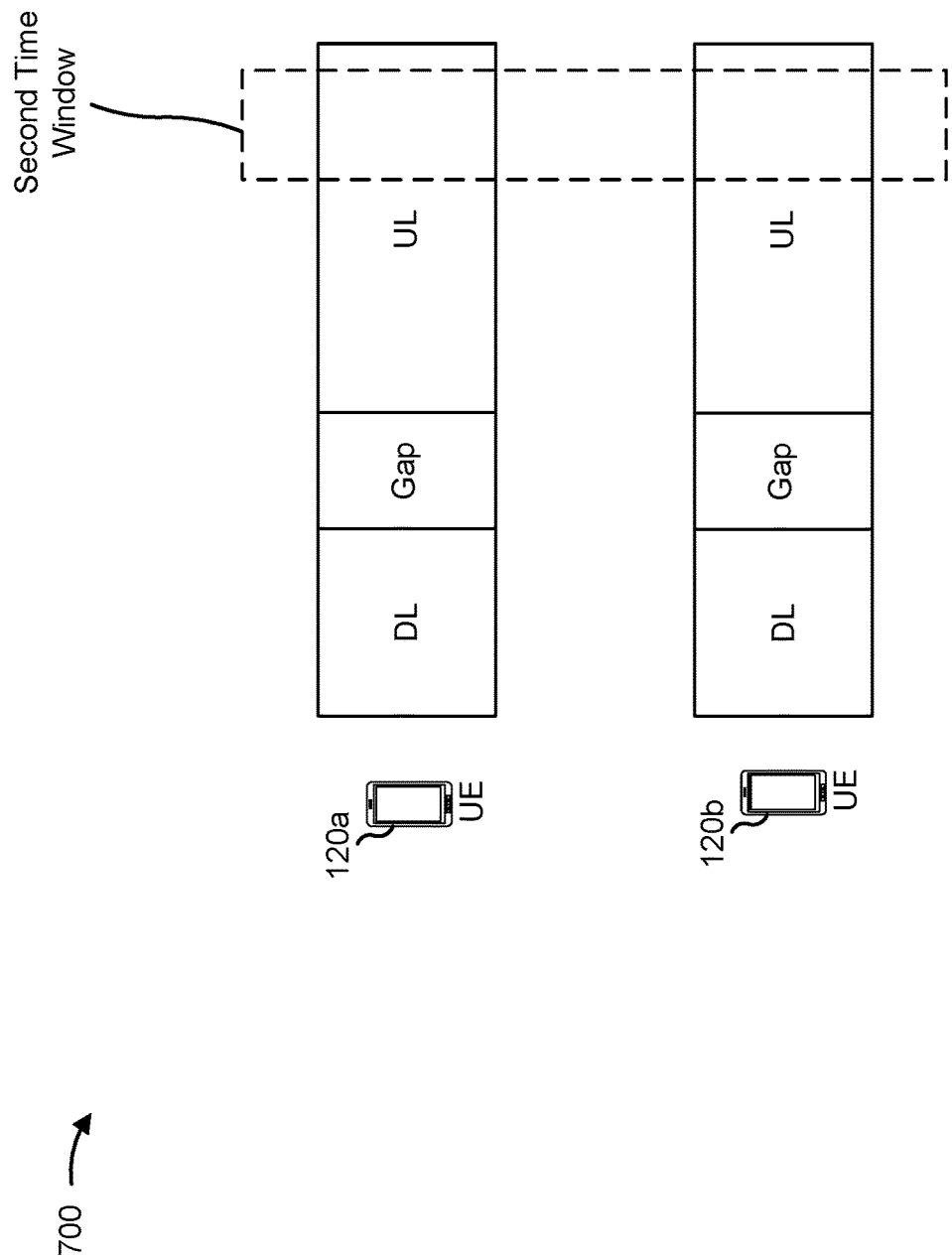

As shown in FIG. 7E, the second time window may include one or more slots. For example, the instruction transmitted by BS 110a to UE 120a may specify that UE 120a is to transmit a CLI-RS during one or more uplink slots included in the wireless communication link between BS 110a and UE 120a. As another example, the instruction transmitted by BS 110b to UE 120b may specify that UE 120b is to transmit a CLI-RS during one or more uplink slots included in the wireless communication link between BS 110b and UE 120b.

In some aspects, the second time window may include one or more slots that are not included in the first time window. For example, the second time window may include one or more slots that occur earlier in time relative to the one or more slots included in the first time window, or that occur later in time relative to the one or more slots included in the first time window. In this way, the first time window and the second time window do not overlap, which prevents the RI-RS, transmitted by BS 110*a*, from interfering with a CLI-RS that is transmitted during the second time window.

In some aspects, to increase the accuracy of a measurement of a CLI-RS that is transmitted during the second time window, a BS may specify, in the instruction, that the CLI-RS, to be transmitted by a UE, is to be transmitted in an initial and/or active uplink bandwidth part (BWP) of the wireless communication link between the BS and the UE. In this way, the UE transmits the CLI-RS using a frequency that is actively used by the UE to transmit on an uplink of the wireless communication link between the BS and the UE.

In some aspects, a BS may specify that the CLI-RS, to be transmitted by a UE, is to be transmitted without a timing advance (TA). In some cases, UE to UE CLI may particularly be an issue when both UEs are located near the edge of respective serving cells. For example, if UE 120*a* is near the edge of BS 110*a*'s serving cell, UE 120*a* may transmit an uplink communication with relatively high transmit power so that the uplink communication can reach BS 110*a*. If UE 120*b* is located near an edge of BS 110*b*'s serving cell that is adjacent to the edge of BS 110*a*'s serving cell, the relatively high transmit power of UE 120*a* may cause CLI with downlink communications that are received at UE 120*b*. While BS 110*a* may schedule communications between BS 110*a* and UE 120*a* with a relatively large timing advance (e.g., relative to a timing advance if UE 120*a* were located near BS 110*a*) to compensate for the distance between BS 110*a* and UE 120*a*, BS 110*a* may be unable to accurately determine a timing advance for the CLI-RS because UE 120*a* and UE 120*b* may be located relatively near each other. In this case, BS 110*a* may instruct UE 120*a* to transmit a CLI-RS to UE 120*b* without a timing advance, but may include, in the second time window, a buffer period (e.g., 10 µs, 100 µs, and/or the like), after the transmission of the CLI-RS, to buffer the transmission of the CLI-RS. The buffer period may include one or more symbols, a portion of one or more symbols (e.g., a half symbol and/or another portion of a symbol), and/or the like.

In some aspects, if BS 110*a* instructs UE 120*a* to transmit a CLI-RS during the second time window, BS 110*a* may determine, based at least in part on an uplink transmission schedule for UE 120*a*, one or more communications that are to be transmitted as the CLI-RS during the time window, and may specify, in the instruction, to transmit the one or more communications as the CLI-RS during the second time window. The one or more communications may include a scheduled data communication, a scheduled reference signal (e.g., a demodulation reference signal (DMRS), a sounding reference signal (SRS), a channel state information reference signal (CSI-RS), and/or the like), and/or the like. If UE 120*a* has no scheduled transmission during the second time window, or has a transmission that only partially occupies the second time window, BS 110*a* may schedule the transmission of another reference signal and/or a repetitive data transmission (e.g., a string of 1's, a string of 0's, a pattern of data, and/or the like) so that transmissions by UE 120*a* fully occupy the second time window.

Similarly, if BS 110*b* instructs UE 120*b* to transmit a CLI-RS during the second time window, BS 110*b* may determine, based at least in part on an uplink transmission schedule for UE 120*b*, one or more communications that are to be transmitted as the CLI-RS during the time window, and may specify, in the instruction, to transmit the one or more communications as the CLI-RS during the second time window. The one or more communications may include a scheduled data communication, a scheduled reference signal, and/or the like. If UE 120*b* has no scheduled transmission during the second time window, or has a transmission that only partially occupies the second time window, BS 110*b* may schedule the transmission of another reference signal and/or a repetitive data transmission so that transmissions by UE 120*b* fully occupy the second time window.

Figure 7F:
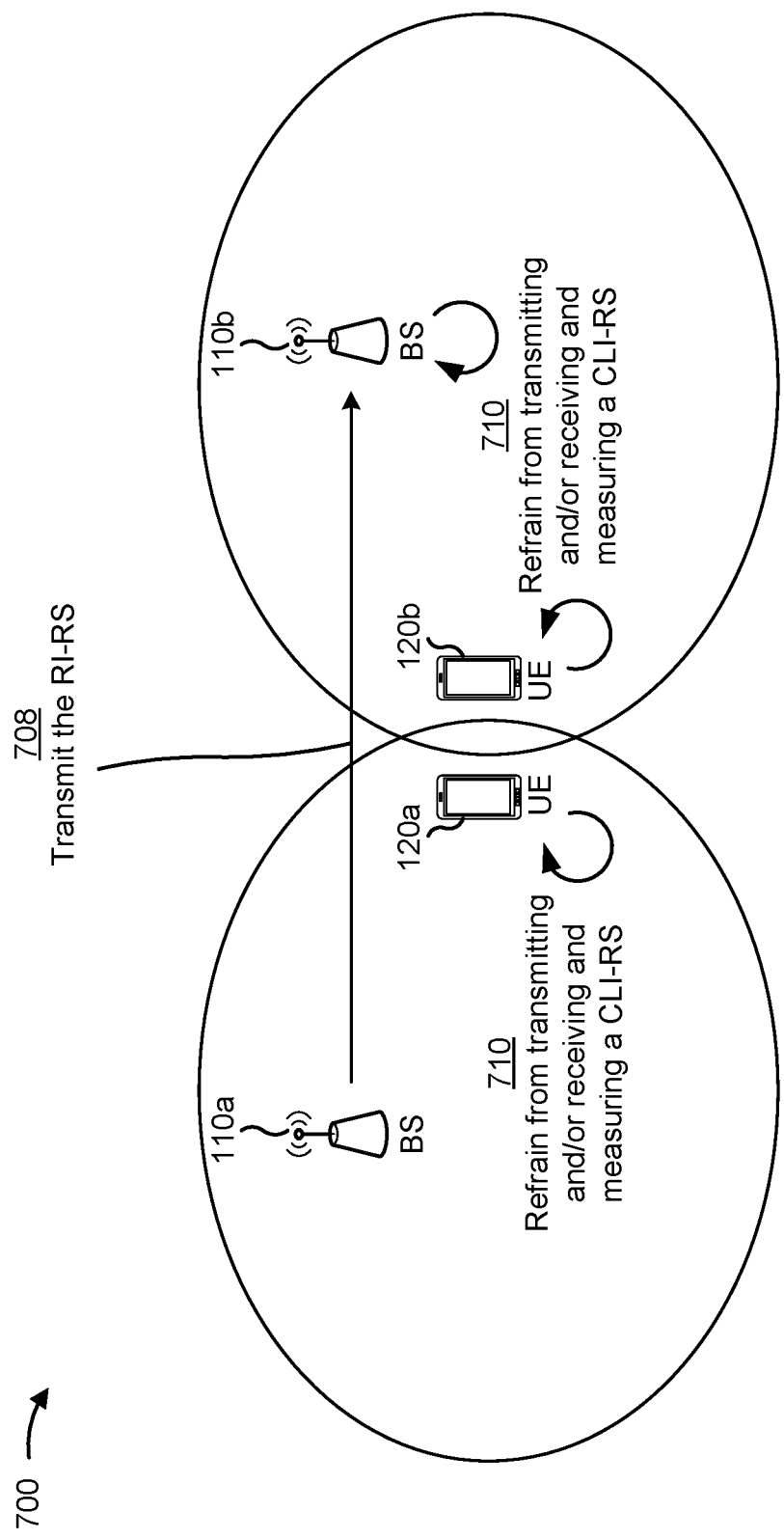

As shown in FIG. 7F, and by reference number 708, BS 110*a* may transmit the RI-RS. BS 110*b* may receive and measure the RI-RS, and may transmit, to BS 110*a*, a feedback communication that includes information identifying the measurement of the RI-RS, which may include a reference signal received power (RSRP) measurement, a received signal strength indication (RSSI) measurement, and/or the like. In this way, BS 110*a* may receive the feedback communication and may adjust one or more parameters associated with BS 110*a* (e.g., transmit power, frame structure, and/or the like) to reduce and/or eliminate any remote interference that BS 110*a* causes at BS 110*b*.

As further shown in FIG. 7F, and by reference number 710, UE 120*a*, UE 120*b*, and BS 110*b* may refrain from transmitting and/or receiving and measuring a CLI-RS during the first time window so that the RI-RS being transmitted by BS 110*a* does not cause interference with the CLI-RS if the CLI-RS would have otherwise been transmitted during the first time window. In some aspects, UE 120*a*, UE 120*b*, and BS 110*b* may refrain from transmitting and/or receiving and measuring the CLI-RS during the first time window based at least in part on receiving the instruction (e.g., from BS 110*a* in the case of UE 120*a*, from BS 110*b* in the case of UE 120*b*, from a network function device and/or another entity included in the wireless network in the case of BS 110*b*, and/or the like) to refrain from transmitting and/or receiving and measuring the CLI-RS during the first time window. In some aspects, BS 110*b* may refrain from transmitting and/or receiving and measuring the CLI-RS during the first time window based at least in part on determining that BS 110*a* has transmitted the RI-RS. In some aspects, BS 110*b* may refrain from transmitting and/or receiving and measuring the CLI-RS during the first time window based at least in part on transmitting, to BS 110*a*, an indication that BS 110*a* is causing remote interference with BS 110*b*.

Figure 7G:
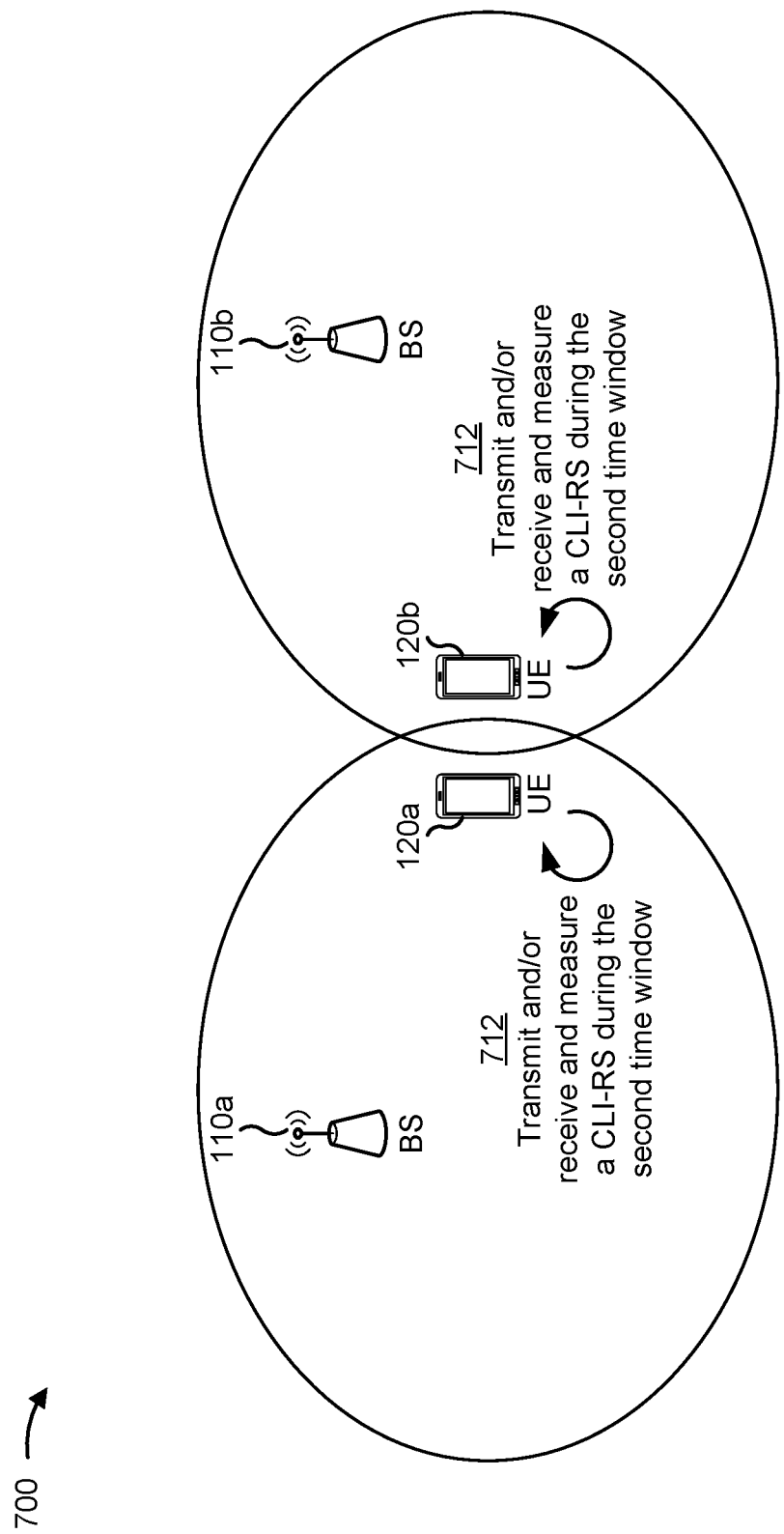

As shown in FIG. 7G, and by reference number 712, UE 120*a* and/or UE 120*b* may transmit and/or receive and measure a CLI-RS during the second time window. As explained above, the second time window may occur prior in time to, or later in time than, the first time window. In this way, UE 120*a* and/or UE 120*b* may transmit and/or receive and measure a CLI-RS in one or more slots that do not overlap with the RI-RS, which prevents the RI-RS from causing interference with the transmission and/or reception and measurement of the CLI-RS.

In some aspects, if a UE is instructed to transmit a CLI-RS during the second time window, the UE may transmit the one or more communications, that are scheduled for transmission by the UE during the second time window, as the CLI-RS, which may include one or more data communications, one or more reference signals, one or more repetitive data signals, and/or the like. In some aspects, if a UE is instructed to receive and measure a CLI-RS during the second time window, the UE may perform an RSSI measurement for a data communication and/or a repetitive data communication that is transmitted as part of the CLI-RS, may perform an RSSI measurement and/or a RSRP measurement for a reference signal that is transmitted as part of the CLI-RS, and/or the like.

In this way, BS 110*a* and/or BS 110*b* configures the transmission and/or reception and measurement of one or more CLI-RSs such that the transmission and/or reception and measurement of one or more CLI-RSs do not interfere with the transmission and/or reception and measurement of an RI-RS, such that the transmission and/or reception and measurement of one or more CLI-RSs do not interfere with the transmission and/or reception of data communications, and/or the like. This permits BS 110*a*, BS 110*b*, UE 120*a*, and/or UE 120*b* to perform measurements of a CLI-RS and/or RI-RS with increased accuracy (e.g., due to reduced interference between the CLI-RS and the RI-RS), permits BS 110*a*, BS 110*b*, UE 120*a*, and/or UE 120*b* to transmit and/or receive data communications with reduced interference that would have otherwise resulted from the CLI-RS, and/or the like.

As indicated above, FIGS. 7A-7G are provided as examples. Other examples may differ from what is described with respect to FIGS. 7A-7G.

Figure 8:
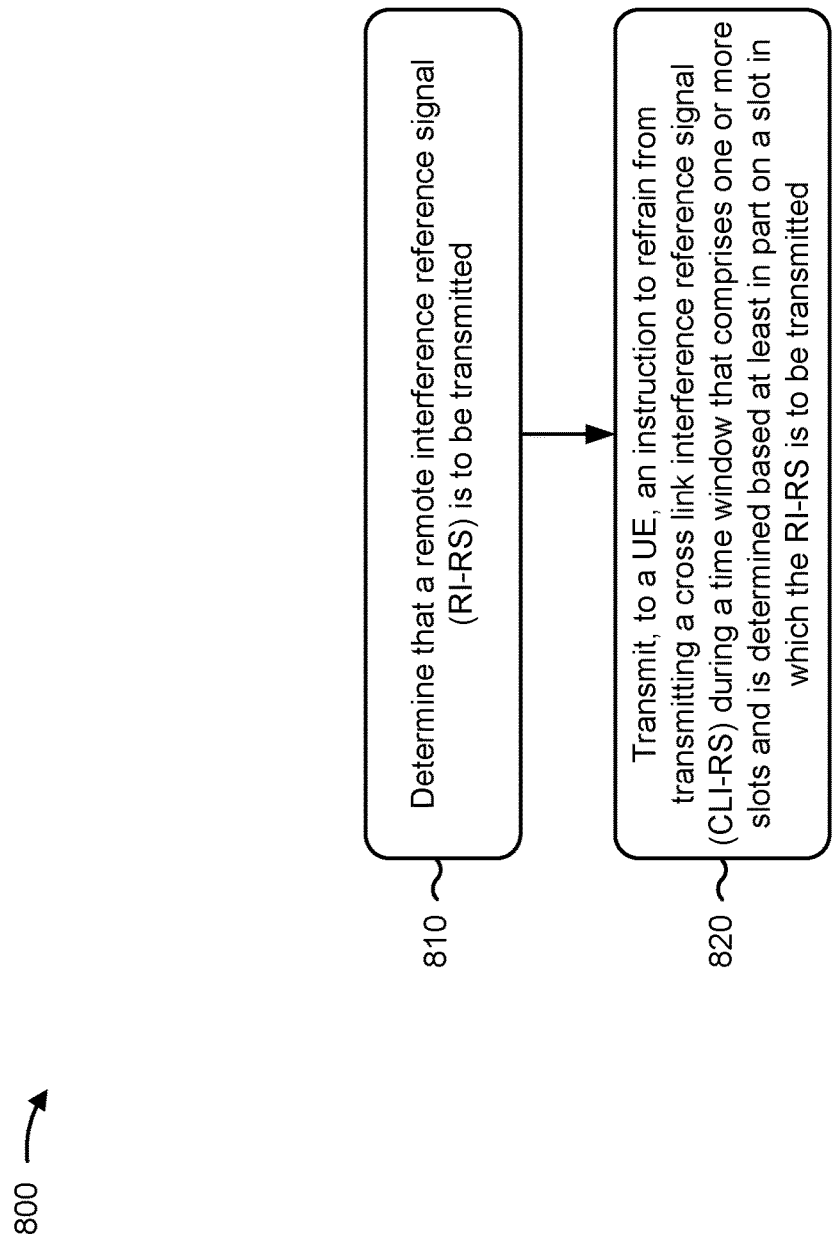

FIG. 8 is a diagram illustrating an example process 800 performed, for example, by a BS, in accordance with various aspects of the present disclosure. Example process 800 is an example where a BS (e.g., BS 110*a*, BS 110*b*, and/or the like) performs cross link interference reference signal configuration.

As shown in FIG. 8, process 800 may include determining that an RI-RS is to be transmitted (block 810). For example, the BS (e.g., using controller/processor 240, memory 242, and/or the like) may determine that an RI-RS is to be transmitted, as described above.

As further shown in FIG. 8, process 800 may include transmitting, to a UE, an instruction to refrain from transmitting a CLI-RS during a time window that comprises one or more slots and is determined based at least in part on a slot in which the RI-RS is to be transmitted (block 820). For example, the BS (e.g., using transmit processor 220, controller/processor 240, memory 242, and/or the like) may transmit, to a UE, an instruction to refrain from transmitting a CLI-RS during a time window that comprises one or more slots and is determined based at least in part on a slot in which the RI-RS is to be transmitted, as described above.

Process 800 may include additional aspects, such as any single aspect or any combination of aspects described below and/or in connection with one or more other processes described elsewhere herein.

In a first aspect, the one or more slots comprise at least one of one or more uplink slots or one or more downlink slots. In a second aspect, alone or in combination with the first aspect, process 800 includes determining, based at least in part on an uplink transmission schedule for the UE, one or more communications that are to be transmitted as the CLI-RS during another time window, and transmitting, to the UE, another instruction to transmit the one or more communications as the CLI-RS during the other time window. In a third aspect, alone or in combination with one or more of the first or second aspects, the other time window is included in an BWP of a wireless communication link between the BS and the UE. In some aspects, the other time window is included in an initial BWP of a wireless communication link between the BS and the UE.

In a fourth aspect, alone or in combination with one or more of the first through third aspects, the other time window includes at least a portion of at least one symbol, after the transmission of the one or more communications as the CLI-RS, that are to buffer the transmission of the one or more communications. In a fifth aspect, alone or in combination with one or more of the first through fourth aspects, the other instruction to transmit the one or more communications as the CLI-RS comprises an instruction to transmit the one or more communications as the CLI-RS without a TA. In a sixth aspect, alone or in combination with one or more of the first through fifth aspects, the one or more communications comprise at least one of a data communication, a DMRS, an SRS, a CSI-RS, or a repetitive data communication.

In a seventh aspect, alone or in combination with one or more of the first through sixth aspects, determining that the RI-RS is to be transmitted comprises determining, based at least in part on receiving an instruction to transmit the RI-RS, that the RI-RS is to be transmitted. In an eighth aspect, alone or in combination with one or more of the first through seventh aspects, determining that the RI-RS is to be transmitted comprises determining, based at least in part on receiving an indication that remote interference has been detected, that the RI-RS is to be transmitted. In a ninth aspect, alone or in combination with one or more of the first through eighth aspects, transmitting the instruction to refrain from transmitting the CLI-RS during the time window comprises transmitting, based at least in part on receiving an instruction to transmit the RI-RS, the instruction to refrain from transmitting the CLI-RS during the time window. In a tenth aspect, alone or in combination with one or more of the first through ninth aspects, transmitting the instruction to refrain from transmitting the CLI-RS during the time window comprises transmitting, based at least in part on receiving an indication that cross link interference has been detected, the instruction to refrain from transmitting the CLI-RS during the time window.

In an eleventh aspect, alone or in combination with one or more of the first through tenth aspects, a quantity of the one or more slots included in the time window is based at least in part on a network configuration for a wireless network in which the BS is included. In a twelfth aspect, alone or in combination with one or more of the first through eleventh aspects, process 800 includes transmitting another instruction to refrain from measuring another CLI-RS during the time window. In a thirteenth aspect, alone or in combination with one or more of the first through twelfth aspects, the time window occupies all of a frequency range, during the one or more slots, of a wireless communication link between the BS and the UE. In a fourteenth aspect, alone or in combination with one or more of the first through thirteenth aspects, the time window occupies a subset of frequency subcarriers, during the one or more slots, of a wireless communication link between the BS and the UE.

Figure 9:
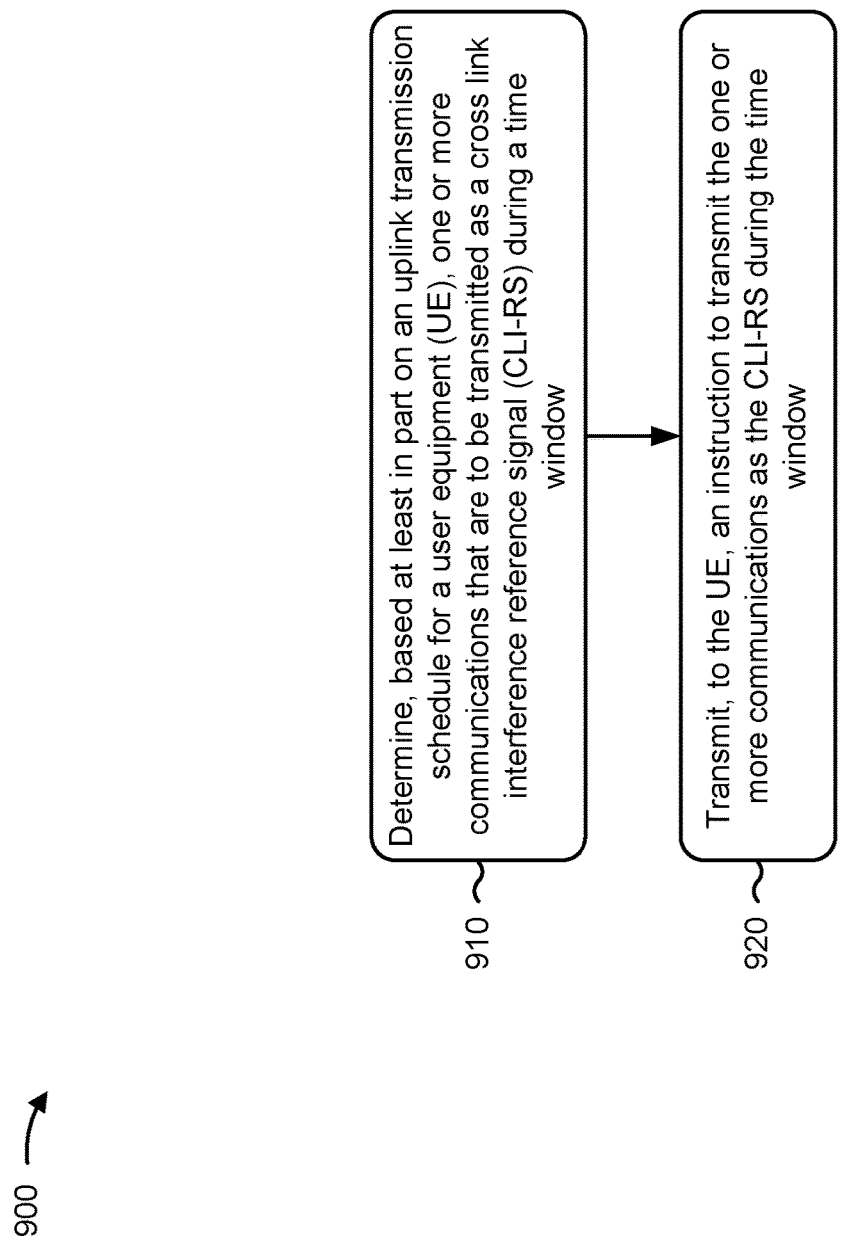

FIG. 9 is a diagram illustrating an example process 900 performed, for example, by a BS, in accordance with various aspects of the present disclosure. Example process 900 is an example where a BS (e.g., BS 110*a*, BS 110*b*, and/or the like) performs cross link interference reference signal configuration.

As shown in FIG. 9, process 900 may include determining, based at least in part on an uplink transmission schedule for a UE, one or more communications that are to be transmitted as a CLI-RS during a time window (block 910). For example, the BS (e.g., using controller/processor 240, memory 242, and/or the like) may determine, based at least in part on an uplink transmission schedule for a UE, one or more communications that are to be transmitted as a CLI-RS during a time window, as described above.

As further shown in FIG. 9, process 900 may include transmitting, to the UE, an instruction to transmit the one or more communications as the CLI-RS during the time window (block 920). For example, the BS (e.g., using transmit processor 220, controller/processor 240, memory 242, and/or the like) may transmit, to the UE, an instruction to transmit the one or more communications as the CLI-RS during the time window, as described above.

Process 900 may include additional aspects, such as any single aspect or any combination of aspects described below and/or in connection with one or more other processes described elsewhere herein.

In a first aspect, process 900 includes determining that an RI-RS is to be transmitted, and transmitting, to the UE, an instruction to refrain from transmitting the CLI-RS during another time window that comprises one or more slots and is determined based at least in part on a slot in which the RI-RS is to be transmitted. In a second aspect, alone or in combination with the first aspect, the one or more slots comprise at least one of one or more uplink slots or one or more downlink slots. In a third aspect, alone or in combination with one or more of the first or second aspects, determining that the RI-RS is to be transmitted comprises determining, based at least in part on receiving an instruction to transmit the RI-RS, that the RI-RS is to be transmitted. In a fourth aspect, alone or in combination with one or more of the first through third aspects, determining, based at least in part on receiving an indication that remote interference has been detected, that the RI-RS is to be transmitted.

In a fifth aspect, alone or in combination with one or more of the first through fourth aspects, transmitting the other instruction to refrain from transmitting the CLI-RS during the other time window comprises transmitting, based at least in part on detecting cross link interference, the other instruction to refrain from transmitting the CLI-RS during the other time window. In a sixth aspect, alone or in combination with one or more of the first through fifth aspects, transmitting the other instruction to refrain from transmitting the CLI-RS during the other time window comprises transmitting, based at least in part on receiving an indication that cross link interference has been detected, the other instruction to refrain from transmitting the CLI-RS during the other time window. In a seventh aspect, alone or in combination with one or more of the first through sixth aspects, a quantity of the one or more slots included in the other time window is based at least in part on a network configuration for a wireless network in which the BS is included.

In an eighth aspect, alone or in combination with one or more of the first through seventh aspects, process 900 includes transmitting a further instruction to refrain from measuring another CLI-RS during the other time window. In a ninth aspect, alone or in combination with one or more of the first through eighth aspects, the other time window occupies all of a frequency range, during the one or more slots, of a wireless communication link between the BS and the UE. In a tenth aspect, alone or in combination with one or more of the first through ninth aspects, the other time window occupies a subset of frequency subcarriers, during the one or more slots, of a wireless communication link between the BS and the UE. In an eleventh aspect, alone or in combination with one or more of the first through tenth aspects, the time window is included in an active uplink BWP of a wireless communication link between the BS and the UE. In a twelfth aspect, alone or in combination with one or more of the first through eleventh aspects, the time window is included in an initial uplink BWP of a wireless communication link between the BS and the UE.

In a thirteenth aspect, alone or in combination with one or more of the first through twelfth aspects, the time window includes at least a portion of at least one symbol, after the transmission of the one or more communications as the CLI-RS, that are to buffer the transmission of the one or more communications as the CLI-RS. In a fourteenth aspect, alone or in combination with one or more of the first through thirteenth aspects, the instruction to transmit the one or more communications as the CLI-RS comprises an instruction to transmit the one or more communications as the CLI-RS without a TA. In a fifteenth aspect, alone or in combination with one or more of the first through fourteenth aspects, the one or more communications comprise at least one of a data communication, a DMRS, an SRS, a CSI-RS, or a repetitive data communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
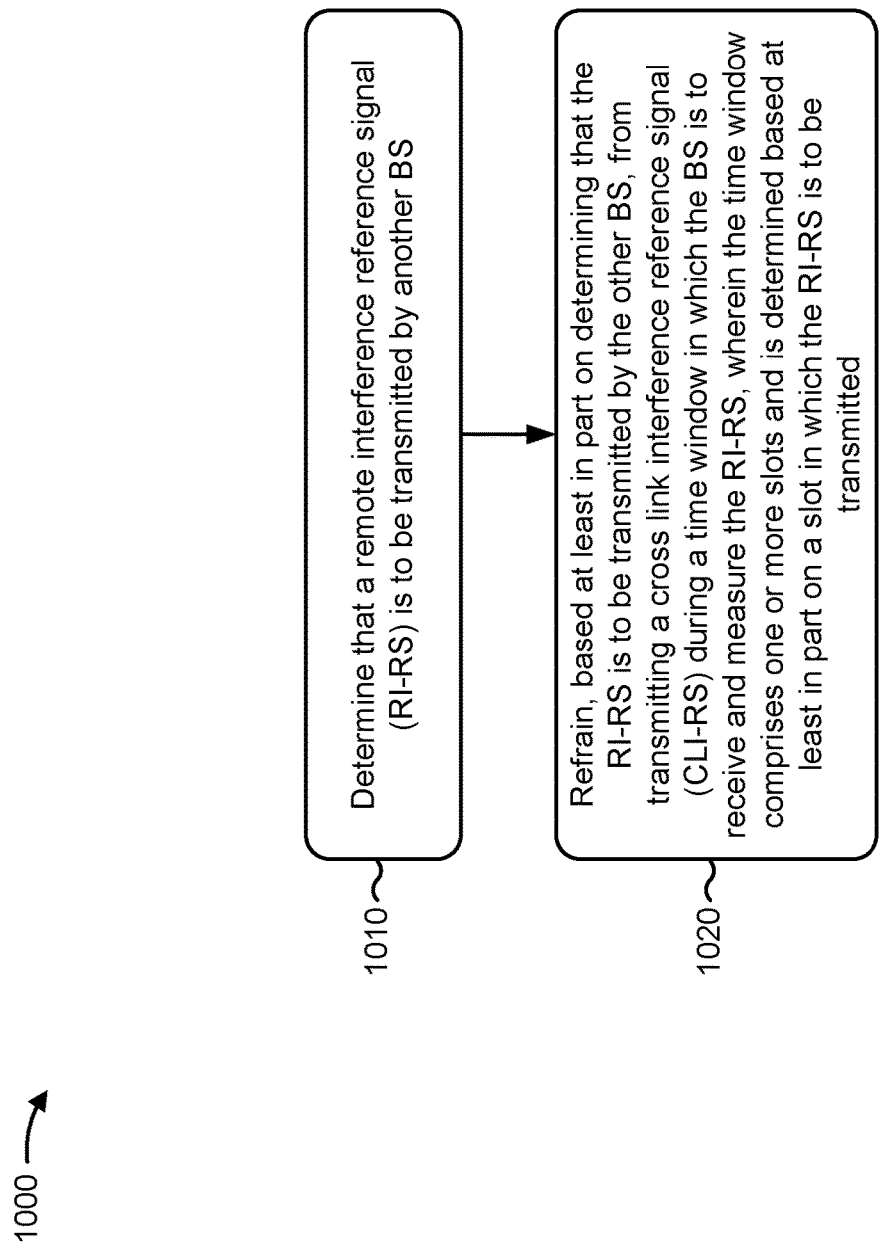

FIG. 10 is a diagram illustrating an example process 1000 performed, for example, by a BS, in accordance with various aspects of the present disclosure. Example process 1000 is an example where a BS (e.g., BS 110a, BS 110b, and/or the like) performs cross link interference reference signal configuration.

As shown in FIG. 10, process 1000 may include determining that an RI-RS is to be transmitted by another BS (block 1010). For example, the BS (e.g., using controller/processor 240, memory 242, and/or the like) may determine that an RI-RS is to be transmitted by another BS, as described above.

As further shown in FIG. 10, process 1000 may include refraining, based at least in part on determining that the RI-RS is to be transmitted by the other BS, from transmitting a CLI-RS during a time window in which the BS is to receive and measure the RI-RS, wherein the time window comprises one or more slots and is determined based at least in part on a slot in which the RI-RS is to be transmitted (block 1020). For example, the BS (e.g., using transmit processor 220, receive processor 238, controller/processor 240, memory 242, and/or the like) may refrain, based at least in part on determining that the RI-RS is to be transmitted by the other BS, from transmitting a CLI-RS during a time window in which the BS is to receive and measure the RI-RS, as described above. In some aspects the time window comprises one or more slots and is determined based at least in part on a slot in which the RI-RS is to be transmitted.

Process 1000 may include additional aspects, such as any single aspect or any combination of aspects described below and/or in connection with one or more other processes described elsewhere herein.

In a first aspect, process 1000 includes transmitting, to a UE, an instruction to perform at least one of an RSSI measurement based at least in part on a data communication that is transmitted, by another UE, as part of another CLI-RS transmitted by the other UE, or an RSRP measurement based at least in part on a reference signal that is transmitted, by another UE, as part of the other CLI-RS transmitted by the other UE. In a second aspect, alone or in combination with the first aspect, the time window is included in an active uplink BWP of a wireless communication link between the BS and the UE Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a BS, in accordance with various aspects of the present disclosure. Example process 1100 is an example where a BS (e.g., BS 110a, BS 110b, and/or the like) performs cross link interference reference signal configuration.

As shown in FIG. 11, process 1100 may include determining that an RI-RS is to be transmitted by another BS (block 1110). For example, the BS (e.g., using controller/processor 240, memory 242, and/or the like) may determine that a remote interference reference signal (RI-RS) is to be transmitted by another BS, as described above.

As further shown in FIG. 11, process 1100 may include refraining, based at least in part on determining that the RI-RS is to be transmitted by the other BS, from receiving and measuring a CLI-RS during a time window in which the BS is to receive and measure the RI-RS, wherein the time window comprises one or more slots and is determined based at least in part on a slot in which the RI-RS is to be transmitted (block 1120). For example, the BS (e.g., using transmit processor 220, receive processor 238, controller/processor 240, memory 242, and/or the like) may refrain, based at least in part on determining that the RI-RS is to be transmitted by the other BS, from receiving and measuring a CLI-RS during a time window in which the BS is to receive and measure the RI-RS, as described above. In some aspects the time window comprises one or more slots and is determined based at least in part on a slot in which the RI-RS is to be transmitted.

Process 1100 may include additional aspects, such as any single aspect or any combination of aspects described below and/or in connection with one or more other processes described elsewhere herein.

In a first aspect, process 1100 includes transmitting, to a UE, an instruction to perform at least one of an RSSI measurement based at least in part on a data communication that is transmitted, by another UE, as part of another CLI-RS transmitted by the other UE, or an RSRP measurement based at least in part on a reference signal that is transmitted, by another UE, as part of the other CLI-RS transmitted by the other UE. In a second aspect, alone or in combination with the first aspect, the time window is included in an active uplink BWP of a wireless communication link between the BS and the UE Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods are described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
    determining that a remote interference reference signal (RI-RS) is to be transmitted;
    transmitting, to a user equipment (UE), an instruction to refrain from transmitting a cross link interference reference signal (CLI-RS) during a time window that comprises one or more slots and is determined based at least in part on a slot in which the RI-RS is to be transmitted and a propagation delay associated with the RI-RS;
    determining, based at least in part on an uplink transmission schedule for the UE, one or more communications that are to be transmitted as the CLI-RS during another time window; and
    transmitting, to the UE, another instruction to transmit the one or more communications as the CLI-RS during the other time window.

2. The method of claim 1, wherein the other time window is included in an active uplink bandwidth part (BWP) of a wireless communication link between the BS and the UE.

3. The method of claim 1, wherein the other time window is included in an initial uplink bandwidth part (BWP) of a wireless communication link between the BS and the UE.

4. The method of claim 1, wherein the other time window includes at least a portion of at least one symbol, after a transmission of the one or more communications as the CLI-RS, that are to buffer the transmission of the one or more communications.

5. The method of claim 1, wherein the other instruction to transmit the one or more communications as the CLI-RS comprises:
an instruction to transmit the one or more communications as the CLI-RS without a timing advance (TA).

6. The method of claim 1, wherein the one or more communications comprise at least one of:
a data communication,
a demodulation reference signal (DMRS),
a sounding reference signal (SRS),
a channel state information reference signal (CSI-RS), or
a repetitive data communication.

7. The method of claim 1, wherein transmitting the instruction to refrain from transmitting the CLI-RS during the time window comprises:
transmitting, based at least in part on receiving an instruction to transmit the RI-RS, the instruction to refrain from transmitting the CLI-RS during the time window.

8. The method of claim 1, wherein transmitting the instruction to refrain from transmitting the CLI-RS during the time window comprises:
transmitting, based at least in part on receiving an indication that cross link interference has been detected, the instruction to refrain from transmitting the CLI-RS during the time window.

9. The method of claim 1, wherein a quantity of the one or more slots included in the time window is based at least in part on a network configuration for a wireless network in which the BS is included.

10. The method of claim 1, wherein the time window occupies all of a frequency range, during the one or more slots, of a wireless communication link between the BS and the UE.

11. The method of claim 1, wherein the time window occupies a subset of frequency subcarriers, during the one or more slots, of a wireless communication link between the BS and the UE.

12. A base station (BS) for wireless communication, comprising:
one or more memories; and
one or more processors, coupled to the one or more memories, configured to cause the BS to:
determine that a remote interference reference signal (RI-RS) is to be transmitted;
transmit, to a user equipment (UE), an instruction to refrain from transmitting a cross link interference reference signal (CLI-RS) during a time window that comprises one or more slots and is determined based at least in part on a slot in which the RI-RS is to be transmitted and a propagation delay associated with the RI-RS;
determine, based at least in part on an uplink transmission schedule for the UE, one or more communications that are to be transmitted as the CLI-RS during another time window; and
transmit, to the UE, another instruction to transmit the one or more communications as the CLI-RS during the other time window.

13. The BS of claim 12, wherein the other time window is included in an active uplink bandwidth part (BWP) of a wireless communication link between the BS and the UE.

14. The BS of claim 12, wherein the other time window is included in an initial uplink bandwidth part (BWP) of a wireless communication link between the BS and the UE.

15. The BS of claim 12, wherein the other time window includes at least a portion of at least one symbol, after a transmission of the one or more communications as the CLI-RS, that are to buffer the transmission of the one or more communications.

16. The BS of claim 12, wherein the other instruction to transmit the one or more communications as the CLI-RS comprises:
an instruction to transmit the one or more communications as the CLI-RS without a timing advance (TA).

17. The BS of claim 12, wherein the one or more communications comprise at least one of:
a data communication,
a demodulation reference signal (DMRS),
a sounding reference signal (SRS),
a channel state information reference signal (CSI-RS), or
a repetitive data communication.

18. The BS of claim 12, wherein the one or more processors, to cause the BS to transmit the instruction to refrain from transmitting the CLI-RS during the time window, are configured to cause the BS to:
transmit, based at least in part on receiving an instruction to transmit the RI-RS, the instruction to refrain from transmitting the CLI-RS during the time window.

19. The BS of claim 12, wherein the one or more processors, to cause the BS to transmit the instruction to refrain from transmitting the CLI-RS during the time window, are configured to cause the BS to:
transmit, based at least in part on receiving an indication that cross link interference has been detected, the instruction to refrain from transmitting the CLI-RS during the time window.

20. The BS of claim 12, wherein a quantity of the one or more slots included in the time window is based at least in part on a network configuration for a wireless network in which the BS is included.

21. The BS of claim 12, wherein the time window occupies all of a frequency range, during the one or more slots, of a wireless communication link between the BS and the UE.

22. The BS of claim 12, wherein the time window occupies a subset of frequency sub carriers, during the one or more slots, of a wireless communication link between the BS and the UE.

23. A non-transitory computer-readable medium storing a set of instructions for wireless communication, the set of instructions comprising:
one or more instructions that, when executed by one or more processors of a base station (BS), cause the BS to:
determine that a remote interference reference signal (RI-RS) is to be transmitted;
transmit, to a user equipment (UE), an instruction to refrain from transmitting a cross link interference reference signal (CLI-RS) during a time window that comprises one or more slots and is determined based at least in part on a slot in which the RI-RS is to be transmitted and a propagation delay associated with the RI-RS;
determine, based at least in part on an uplink transmission schedule for the UE, one or more communications that are to be transmitted as the CLI-RS during another time window; and transmit, to the UE, another instruction to transmit the one or more communications as the CLI-RS during the other time window.

24. The non-transitory computer-readable medium of claim 23, wherein the other time window is included in an active uplink bandwidth part (BWP) of a wireless communication link between the BS and the UE.

25. The non-transitory computer-readable medium of claim 23, wherein the other time window is included in an initial uplink bandwidth part (BWP) of a wireless communication link between the BS and the UE.

26. The non-transitory computer-readable medium of claim 23, wherein the other time window includes at least a portion of at least one symbol, after a transmission of the one or more communications as the CLI-RS, that are to buffer the transmission of the one or more communications.

27. The non-transitory computer-readable medium of claim 23, wherein the other instruction to transmit the one or more communications as the CLI-RS comprises:
an instruction to transmit the one or more communications as the CLI-RS without a timing advance (TA).

28. The non-transitory computer-readable medium of claim 23, wherein the one or more communications comprise at least one of:
a data communication,
a demodulation reference signal (DMRS),
a sounding reference signal (SRS),
a channel state information reference signal (CSI-RS), or
a repetitive data communication.

29. The non-transitory computer-readable medium of claim 23, wherein the one or more instructions, that cause the BS to transmit the instruction to refrain from transmitting the CLI-RS during the time window, cause the BS to:
transmit, based at least in part on receiving an instruction to transmit the RI-RS, the instruction to refrain from transmitting the CLI-RS during the time window.

30. An apparatus for wireless communication, comprising:
means for determining that a remote interference reference signal (RI-RS) is to be transmitted;
means for transmitting, to a user equipment (UE), an instruction to refrain from transmitting a cross link interference reference signal (CLI-RS) during a time window that comprises one or more slots and is determined based at least in part on a slot in which the RI-RS is to be transmitted and a propagation delay associated with the RI-RS;
means for determining, based at least in part on an uplink transmission schedule for the UE, one or more communications that are to be transmitted as the CLI-RS during another time window; and
means for transmitting, to the UE, another instruction to transmit the one or more communications as the CLI-RS during the other time window.

* * * * *